(12) United States Patent
Hughes et al.

(10) Patent No.: US 8,189,050 B1
(45) Date of Patent: May 29, 2012

(54) FILTERING SYSTEMS AND METHODS FOR INFRARED IMAGE PROCESSING

(75) Inventors: Gary B. Hughes, Santa Maria, CA (US); Nicholas Högasten, Santa Barbara, CA (US); Nuwan Nagahawatte, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 1294 days.

(21) Appl. No.: 11/838,112

(22) Filed: Aug. 13, 2007

Related U.S. Application Data

(63) Continuation-in-part of application No. 11/490,267, filed on Jul. 19, 2006, now Pat. No. 8,004,564.

(51) Int. Cl.
*H04N 5/33* (2006.01)

(52) U.S. Cl. .................... 348/164; 348/162; 348/163

(58) Field of Classification Search ........... 348/162–164
See application file for complete search history.

(56) References Cited

U.S. PATENT DOCUMENTS

| | | | |
|---|---|---|---|
| 3,821,795 A | 6/1974 | Okano | |
| 4,009,939 A | 3/1977 | Okano | |
| 4,101,929 A | 7/1978 | Ohneda et al. | |
| 4,590,582 A | 5/1986 | Umemura | |
| 4,675,532 A | 6/1987 | Carson | |
| 4,795,236 A | 1/1989 | Ise | |
| 4,860,104 A | 8/1989 | Katsuyama | |
| 5,029,010 A | 7/1991 | Shiraishi | |
| 5,337,181 A | 8/1994 | Kelly | |
| 5,409,007 A | 4/1995 | Saunders et al. | |
| 5,755,501 A | 5/1998 | Shinohara et al. | |
| 5,903,680 A | 5/1999 | DeHaan et al. | |
| 6,373,992 B1 | 4/2002 | Nagao | |
| 6,625,302 B2 * | 9/2003 | Kalscheur et al. | 382/110 |
| 7,308,153 B1 | 12/2007 | Wang | |
| 2003/0024481 A1 * | 2/2003 | Kalscheur et al. | 119/174 |
| 2003/0031362 A1 * | 2/2003 | Keithley | 382/167 |
| 2004/0037457 A1 | 2/2004 | Wengender et al. | |
| 2005/0178130 A1 | 8/2005 | Van Gilder et al. | |
| 2005/0238234 A1 | 10/2005 | Lin | |
| 2010/0259492 A1 * | 10/2010 | Chang | 345/173 |
| 2011/0002536 A1 * | 1/2011 | Thomasson et al. | 382/165 |

OTHER PUBLICATIONS

Cressie, N.A., Statistics for Spatial Data, John Wiley & Sons, New York, ISBN: 0 471 00255 0, 1993, 15 pages.

Canny, J.F., A computational approach to edge detection, IEEE Transaction on Pattern Analysis and Machine Intelligence, 1986, vol. 8, No. 6, pp. 679-698.

Beaudet, P.R., Rotational Invariant Image Operators, Int'l Joint Conf. Pattern Recognition, 1978, pp. 579-583.

Fang, J.Q., and Huang, T.S., A Corner Finding Algorithm for Image Analysis and Registration, Proc. AAAI Conf., 1982, pp. 46-49.

Harris, C.G., Determination of Ego-Motion From Matched Points, Proc. Alvey Vision Conf., Cambridge, UK, 1987, pp. 189-192.

Zuniga, O.A. and Haralick, R.M., Corner Detection Using the Facet Model, Proc. Conf. Pattern Recognition and Image Processing, 1983, pp. 30-37.

(Continued)

*Primary Examiner* — Mohamed Wasel
(74) *Attorney, Agent, or Firm* — Haynes and Boone, LLP

(57) ABSTRACT

Systems and methods are disclosed herein to provide filtering techniques for image processing applications. For example, in accordance with an embodiment of the present invention, a Median-X filtering algorithm is disclosed that may be used for various infrared image processing applications.

23 Claims, 19 Drawing Sheets

OTHER PUBLICATIONS

Dreschler, L., and Nagel, H.H., Volumetric Model and 3D Trajectory of a Moving Car Derived From Monocular TV Frame Sequences of a Street Scene, Int'l Joint Conf. Artificial Intelligence, 1981, pp. 692-697.

Arrebola, F., A. Bandera, P. Camacho, and F. Sandoval, Corner Detection by Local Histograms of Contour Chain Code, Electronic Letters, 1997, vol. 33, No. 21, pp. 1769-1771.

Chen, W.C., and Rockett, P., Bayesian Labelling of Corners Using a grey-Level Corner Image Model, IEEE Int'l Conf. Image Processing, 1997, vol. 1, pp. 687-690.

Davies, E.R., Application of the Generalized Hough Transform to Corner Detection, IEE Proc., 1988, vol. 135, pp. 49-54.

Grigorescu, C, Petkov, N., and Westenberg, M.A., Contour and boundary detection improved by surround suppression of texture edges, Image and Vision Computing, 2004, v. 22, pp. 609-622.

Ji, Q and Haralick, R.M., Corner Detection With Covariance Propagation, Proc. IEEE Conf. Computer Vision and Pattern Recognition, 1997, pp. 362-367.

Kitchen, L and Rosenfeld, A., Gray Level Corner Detection, Pattern Recognition Letters, 1982, pp. 95-102.

Kohlmann, K., Corner Detection in Natural Images Based on the 2-D Hilbert Transform, Signal Processing, 1996, vol. 48, No. 3, pp. 225-234.

Lai, K.K. and Wu, P.S.Y., Effective Edge-Corner Detection Method for Defected Images, Proc. Int'l Conf. Signal Processing, 996, vol. 2, pp. 1151-1154.

Lee, K.J. and Bien, Z., Grey-Level Corner Detector Using Fuzzy Logic, Pattern Recognition Letters, 1996, vol. 17, No. 9, pp. 939-950.

Mehrotra, R., Nichani, S., and Ranganathan, N., Corner Detection, Pattern Recognition, 1990, vol. 23, No. 11, pp. 1223-1233.

Mokhtarian, F and Suomela, R., Robust Image Corner Detection Through Curvature Scale Space, IEEE Transactions on Pattern Analysis and Machine Intelligence, Dec. 1998, vol. 20, No. 12, pp. 1376-1381.

Mokhtarian, F. and Mackworth, A.K., A Theory of Multscale, Curvature-Based Shape Representation for Planar Curves, IEEE Trans. Pattern Analysis and Machine Intelligence, Aug. 1992, vol. 14, No. 8, pp. 789-805.

Mokhtarian, F. and Suomela, R., Curvature Scale Space for Robust Image Corner Detection, Int'l Conf. Pattern Recognition, 1998, Brisba, Australia, 3 pages.

Nassif, S, Capson, D., and Vaz, A., Robust Real-Time Corner Location Measurement, Proc. IEEE Conf. Instrumentation and Measurement Technology, 1997, pp. 106-111.

Noble, A., Finding Corners, Image and Vision Computing, 1998, vol. 6, pp. 121-128.

Orange, C.M. and Groen, F.C.A., Model Based Corner Detection, Proc. IEEE Conf. Computer Vision and Pattern Recognition, 1993, pp. 690-691.

Paler, K., Foglein, J., Illingworth, J., and Kittler, J., Local Ordered Grey Levels as an Aid to Corner Detection, Pattern Recognition, 1984, vol. 17, No. 5, pp. 535-543.

Press, W.H., Teukolsy, S.A., Vetterling, W.T., and Flannery, B.P., Numerical Recipes in C: The Art of Scientific Computer, Second Edition, Cambridge University Press, New York, 1992, ISBN: 0 521 43108 5, 13 pages.

Press, W.H., Teukolsy, S.A., Vetterling, W.T., and Flannery, B.P., License Information, Numerical Recipes in C: The Art of Scientific Computer, Second Edition, Cambridge University Press, New York, 1992, ISBN: 0 521 43108 5, 3 pages.

Press, W.H., Teukolsy, S.A., Vetterling, W.T., and Flannery, B.P., 2.1 Gauss-Jordan Elimination, Numerical Recipes in C: The Art of Scientific Computer, Second Edition, Cambridge University Press, New York, 1992, ISBN: 0 521 43108 5, pp. 36-41.

Press, W.H., Teukolsy, S.A., Vetterling, W.T., and Flannery, B.P., 7.1 Uniform Deviates, Numerical Recipes in C: The Art of Scientific Computer, Second Edition, Cambridge University Press, New York, 1992, ISBN: 0 521 43108 5, pp. 275-287.

Press, W.H., Teukolsy, S.A., Vetterling, W.T., and Flannery, B.P., 8.4 Indexing and Ranking, Numerical Recipes in C: The Art of Scientific Computer, Second Edition, Cambridge University Press, New York, 1992, ISBN: 0 521 43108 5, pp. 338-341.

Press, W.H., Teukolsy, S.A., Vetterling, W.T., and Flannery, B.P., 8.5 Selecting the Mth Largest, Numerical Recipes in C: The Art of Scientific Computer, Second Edition, Cambridge University Press, New York, 1992, ISBN: 0 621 43108 5, pp. 341-456.

Press, W.H., Teukolsy, S.A., Vetterling, W.T., and Flannery, B.P., 12.2 Fast Fourier Transform (FFT), Numerical Recipes in C: The Art of Scientific Computer, Second Edition, Cambridge University Press, New York, 1992, ISBN: 0 521 43108 5, pp. 504-510.

Press, W.H., Teukolsy, S.A., Vetterling, W.T., and Flannery, B.P., 12.3 FFT of Real Functions, Sine and Cosine Transforms, Numerical Recipes in C: The Art of Scientific Computer, Second Edition, Cambridge University Press, New York, 1992, ISBN: 0 521 43108 5, pp. 510-521.

Press, W.H., Teukolsy, S.A., Vetterling, W.T., and Flannery, B.P., 13.1 Convolution and Deconvolution Using the FFT, Numerical Recipes in C: The Art of Scientific Computer, Second Edition, Cambridge University Press, New York, 1992, ISBN: 0 521 43108 5, pp. 538-545.

Press, W.H., Teukolsy, S.A., Vetterling, W.T., and Flannery, B.P., 15.4 General Linear Least Squares, Numerical Recipes in C: The Art of Scientific Computer, Second Edition, Cambridge University Press, New York, 1992, ISBN: 0 521 43108 5, pp. 671-680.

Press, W.H., Teukolsy, S.A., Vetterling, W.T., and Flannery, B.P., 15.5 Nonlinear Models, Numerical Recipes in C: The Art of Scientific Computer, Second Edition, Cambridge University Press, New York, 1992, ISBN: 0 521 43108 5, pp. 681-689.

Rangarajan, K., Shah, M. and Van Brackle, D., Optimal Corner Detector, Computer Vision, Graphics, and Image Processing, 1989, vol. 48, pp. 90-94.

Shilat, E., Werman, M., and Gdalyahu, Y., Ridge's Corner Detection and Correspondence, Proc. IEEE Conf. Computer Vision and Pattern Recognition, 1997, pp. 976-981.

Smith, S.M., and Brady, J.M., Susan—A New Approach to Low Level Image Processing, Defense Research Agency, Technical Report No. TR95SMS1, Farnborough, England, 1994, pp. 45-78.

Sohn, Kwanghoon, Kim, Jung H., and Alexander, Winser E., Mean Field Annealing Approach to Robust Corner Detection, IEEE Trans. Systems, Man, and Cybernetics, 1998, vol. 28B, No. 1, pp. 82-90.

Trajkovic, Miroslav and Hedley, Mark, Fast Corner Detection, Image and Vision Computing, 1998, vol. 16, No. 2, pp. 75-87.

Tsai, D.M., Boundary Based Corner Detection Using Neural Networks, Pattern Recognition, 1998, vol. 30, No. 1, pp. 85-97.

Wang, H. and Brady, H., A Practical Solution to Corner Detection, Proc. Int'l Conf. Image Processing, 1994, vol. 1, pp. 919-923.

Wu, Z.O., and Rosenfeld, A., Filtered Projections as an Aid to Corner Detection, Pattern Rocognition, 1983, vol. 16, No. 1, pp. 31-38.

Zhang, X., and Zhao, D., Parallel Algorithm for Detecting Dominant Points on Multiple Digital Curves, Pattern Recognition, 1997, No. 2, pp. 239-244.

Cressie, N.A., Statistics for Spatial Data, John Wiley & Sons, New York, ESBN: 0 471 00255 0, 1993, 1. Examples of Point Patterns, 4 pages.

Cressie, N.A., Statistics for Spatial Data, John Wiley & Sons, New York, ESBN: 0 471 00255 0, 2. Models of Spatial Randomness, 81993, 8 pages.

Cressie, N.A., Statistics for Spatial Data, John Wiley & Sons, New York, ESBN: 0 471 00255 0, 3. Testing Spatial Randomness, 1993, 27 pages.

Cressie, N.A., Statistics for Spatial Data, John Wiley & Sons, New York, ESBN: 0 471 00255 0, Appendix to Part I, 10 pages.

Moravec, Hans P., Towards Automatic Visual Obstacle Avoidance, Proc. Int'l Joint Conf. Artificial Intelligence, 1977, p. 584.

Aiazzi et al., Context-Driven Fusion of High Spatial and Spectral Resolution Images Based on Oversampled Multiresolution Analysis, IEEE Transactions on Geoscience and Remote Sensing, vol. 40, No. 10, Oct. 2002, 13 pages.

Burt et al., The Laplacian Pyramid as a Compact Image Code, IEEE Transactions on Communications, vol. Com-31, No. 4, Apr. 1983, 9 pages.

Hunt et al., Suppression of self-focusing through low-pass spatial filtering and relay imaging, Applied Optics, vol. 17, No. 13, Jul. 1, 1978, 5 pages.

Kim et al., Spatio-Temporal Adaptive 3-D kalman Filter for Video, IEEE Transactions on Image Processing, vol. 6, No. 3, Mar. 1997, 11 pages.

Lewis et al., Image Compression Using the 2-D Wavelet Transform, IEEE Transactions on Image Processing, vol. 1, No. 2, Apr. 1992, 7 pages.

Nestares et al., Efficient Spatial-Domain Implementation of a Multiscale Image Representation Based on Gabor Functions, J. Electronic Imaging, 7, 1998, 10 pags.

Eero P. Simoncelli, Design of Multi-Dimensional Derivative Filters, Computer and Information Science Department, GRASP Laboratory, 0-81886-6950-0/94, 1994, 5 pages.

Bruderlin et al., Motion Signal Processing, Proceedings of the 22nd annual conference on Computer graphics and interactive techniques, Sep. 1995, 8 pages.

Paul J. Caber, Interferometric profiler for rough surfaces, Applied Optics, vol. 32, No. 19, Jul. 1, 1993, 4 pages.

Degtiarev et al., Statial Filtering in nonlinear two-dimensional feedback systems: phase distortion suppression, J. Opt. Soc. Am. B, vol. 12, No. 7, Jul. 1995, 11 pages.

Fleet et al., Recursive Filters for Optical Flow, IEEE Transactions on Pattern Analysis and Machine Intelligence, vol. 17, No. 1, Jan. 1995, 7 pages.

Hirani et al., Combining Frequency and Spatial Domain Information for Fast Interactive Image Noise Removal, Proceedings of the 23rd annual conference on computer graphics and interactive techniques, 1996, 8 pages.

Krolik et al., Focued Wide-Band Array Processing by Spatial Resampling, IEEE Transactions on Acoustics, Speech, and Signal Processing, vol. 38, No. 2, Feb. 1990, 5 pages.

Losada et al., Color and luminance spatial tuning estimated by noise masking in the absence of off-frequency looking, Department of Ophthalmology, J. Opt. Soc. Am. A, vol. 12, No. 2, Feb. 1995, 17 pages.

Darrell et al., Pyramid Based Depth from Focus, Proceedings of the IEEE Computer Society Conference on Computer Vision and Pattern Recognition, 1988, 6 pages.

* cited by examiner

More Uniform than Random

More Clustered than Random

Random Sample of Nearest-Neighbor Distances

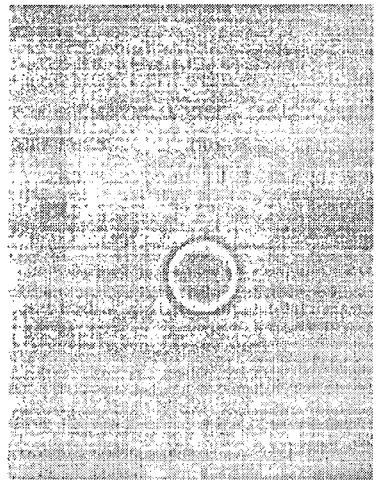
FIG. 9a
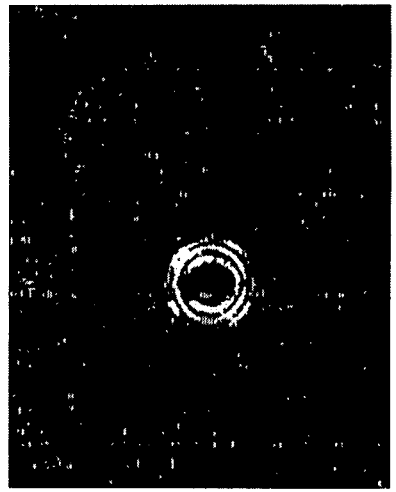
FIG. 9b
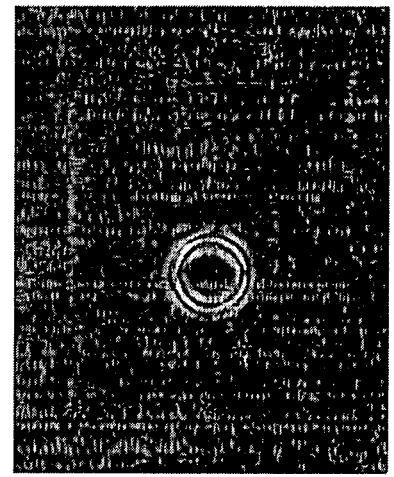
FIG. 9c
FIG. 9d

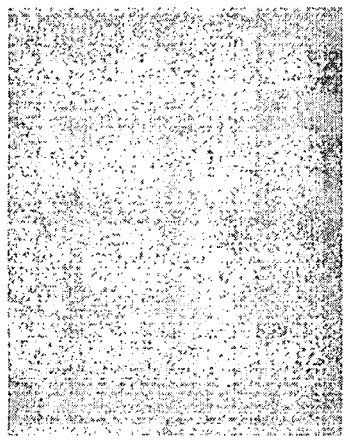
FIG. 12b
FIG. 12a
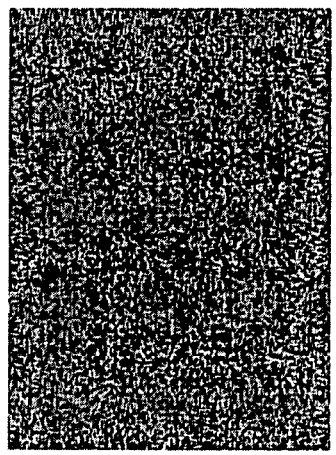
FIG. 12d
FIG. 12c $$\begin{bmatrix}
0 & 1 & \cdots & jCol & \cdots & m-2 & m-1 \\
m & m+1 & & m+jCol & & 2m-2 & 2m-1 \\
2m & 2m+1 & & 2m+jCol & & 3m-2 & 3m-1 \\
\cdots & & \ddots & & & & \\
iRow \cdot m & iRow \cdot m+1 & & iRow \cdot m+jCol & & & \\
& & (iRow-1) \cdot m+jCol-1 & & (iRow-1) \cdot m+jCol+1 & & (iRow+1) \cdot m-1 \\
& & (iRow+1) \cdot m+jCol-1 & & (iRow+1) \cdot m+jCol+1 & & \\
\cdots & & & & & \ddots & \\
(n-1) \cdot m & (n-1) \cdot m+1 & \cdots & (n-1) \cdot m+jCol & & & n \cdot m-1
\end{bmatrix}$$

Center Pixel in the X pattern is:
  $iRow \cdot m + jCol$

For the branches of the X, let $rRad = 1..r$ $(iRow - rRad) \cdot m + jCol - rRad \Rightarrow (iRow \cdot m + jCol) - rRad \cdot (m+1)$   upper left branch
$(iRow - rRad) \cdot m + jCol + rRad \Rightarrow (iRow \cdot m + jCol) - rRad \cdot (m-1)$   upper right branch
$(iRow + rRad) \cdot m + jCol - rRad \Rightarrow (iRow \cdot m + jCol) + rRad \cdot (m-1)$   lower left branch
$(iRow + rRad) \cdot m + jCol + rRad \Rightarrow (iRow \cdot m + jCol) + rRad \cdot (m+1)$   lower right branch

FIG. 17

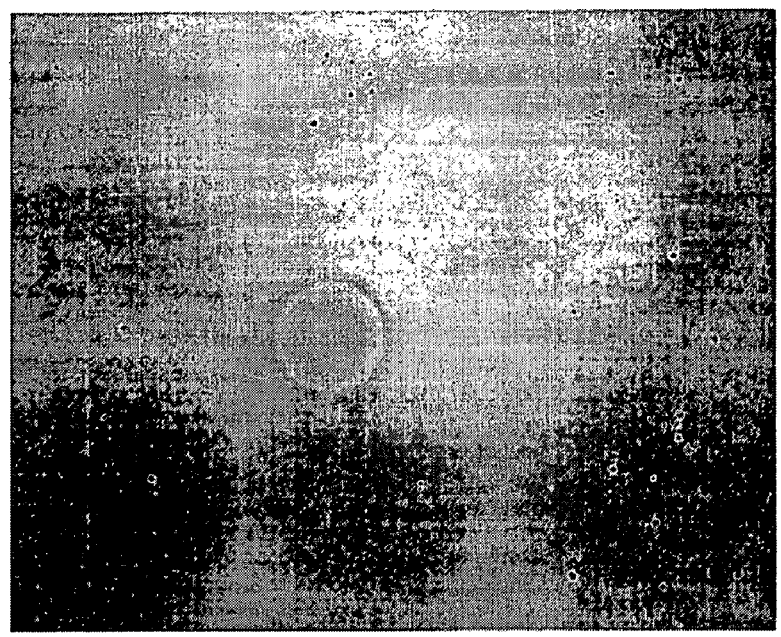
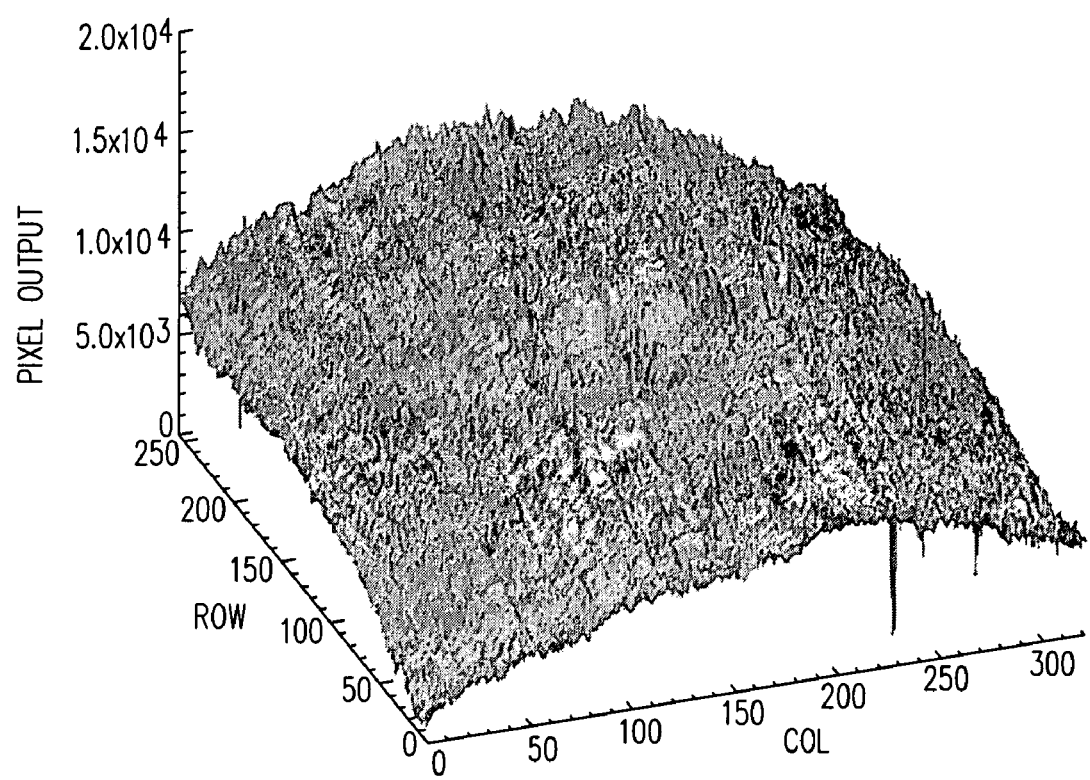
FIG. 18a

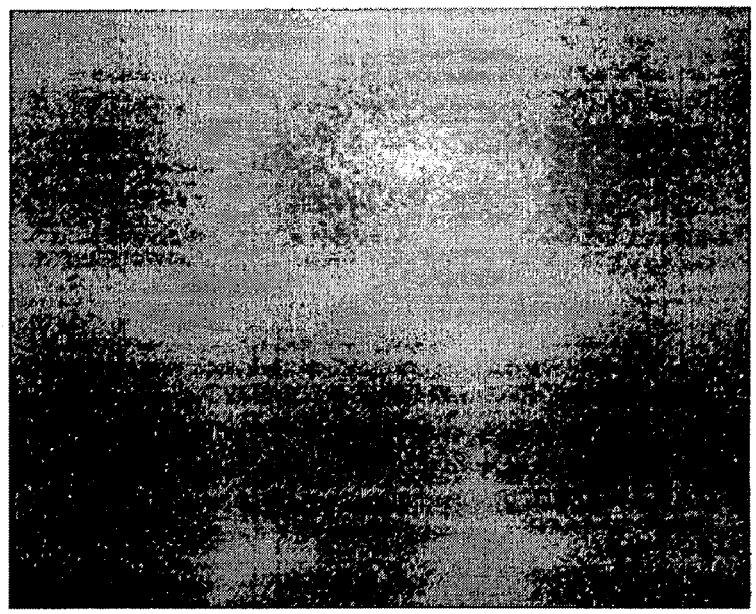
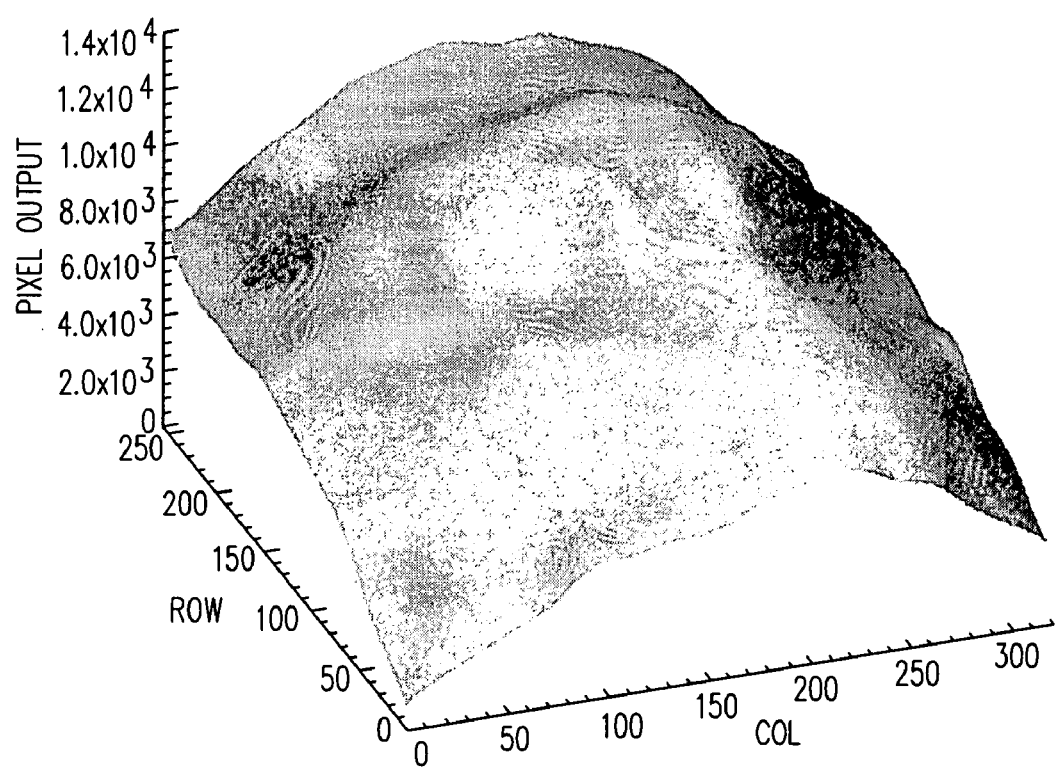
FIG. 18b

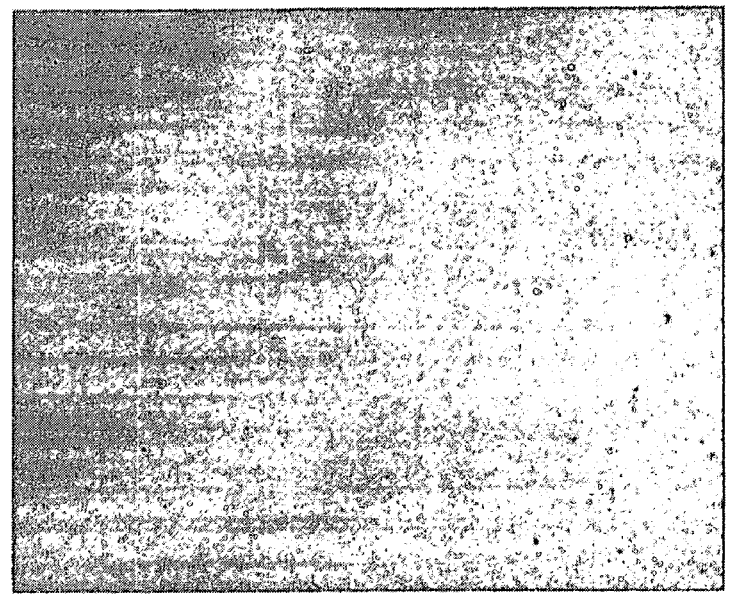
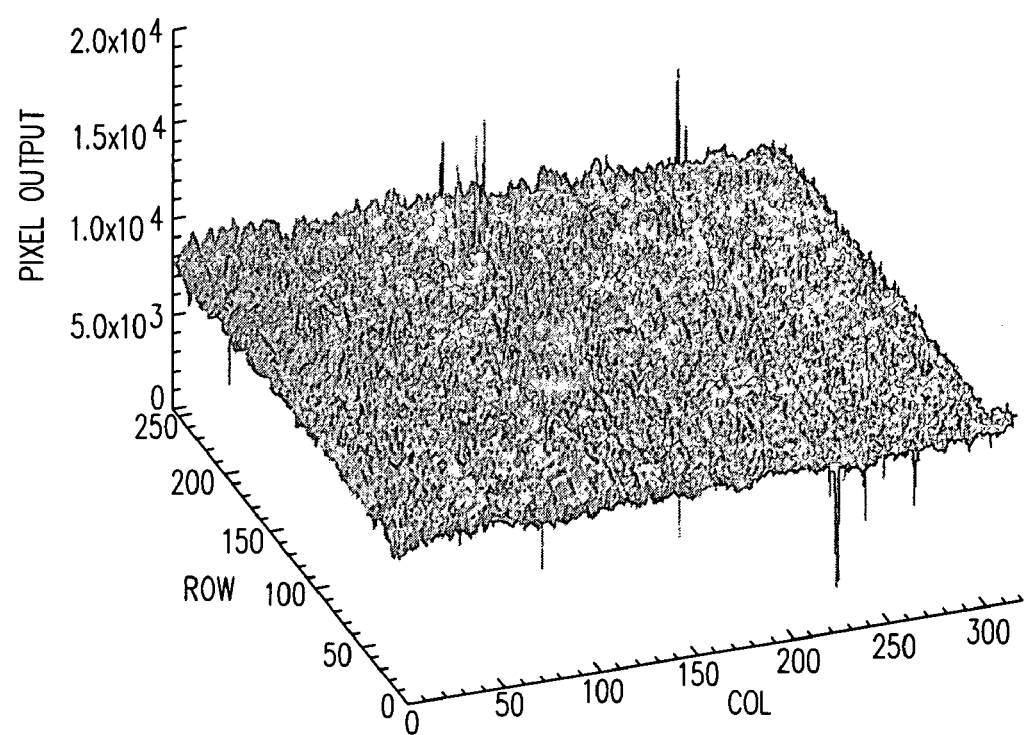
FIG. 18c

FILTERING SYSTEMS AND METHODS FOR INFRARED IMAGE PROCESSING

CROSS-REFERENCE TO RELATED APPLICATIONS

This application claims priority to and is a Continuation-In-Part Patent Application of U.S. patent application Ser. No. 11/490,267, filed Jul. 19, 2006 now U.S. Pat. No. 8,004,564, which is incorporated herein by reference in its entirety.

TECHNICAL FIELD

The present invention relates generally to infrared cameras and, more particularly, to filtering techniques for infrared image processing, such as to provide for example a low-frequency reference frame.

BACKGROUND

Image processing is commonly used in the infrared industry for various purposes. For example, many infrared image processing routines typically rely on filters to extract particular aspects from an image frame. As a specific example, filters are frequently used to separate low-frequency and high-frequency components of an image from the image frame. This process may facilitate noise identification in both frequency regimes. These filters may also be useful for enhancing image quality by emphasizing (or diminishing) details in the image.

Many useful filters are calculated directly from image frame data. The raw frame data may be subjected to numerical manipulation according to the filter algorithm, with the end result being a filtered frame. The filtered frame may then be useful for testing or for image quality improvement. However, the process of calculating a filtered frame from the raw image may be vulnerable to spatial and temporal noise and to outlier pixels in the raw frame, a fact that is particularly evident with infrared images.

For example, raw infrared images may include spatial and temporal noise, with common noise manifestations including for example row and column noise, aperture warping (also known as $\cos^4$ fall-off), and/or flickering, slow, dead, railed, or odd pixels. These noise components can seriously degrade image quality and they can also create problems for filtering schemes. Noisy pixels may have an inordinate effect on neighboring pixels during the filtering process, which may lead to an undesirable result with conventional filtering schemes.

As a result, there is a need for improved filtering techniques for infrared image processing.

SUMMARY

Systems and methods are disclosed herein, in accordance with one or more embodiments of the present invention, to provide filtering techniques for infrared image processing applications. For example, in accordance with an embodiment of the present invention, a method of performing infrared image processing on infrared image data, the method includes receiving one or more infrared image frames of the infrared image data; calculating a median value of an X-shaped kernel surrounding each pixel of the infrared image frame; and providing a low-frequency reference frame based on the calculating.

In accordance with another embodiment of the present invention, an infrared camera system includes a processor; a memory storing instructions for the processor to perform infrared image processing which includes performing a Median-X filtering algorithm on one or more infrared image frames; and providing one or more low-frequency reference frames based on the performing of the Median-X filtering algorithm.

In accordance with another embodiment of the present invention, a machine-readable medium contains information to provide a processor-based device with the capability to perform a method of infrared image processing, the method includes performing a Median-X filtering algorithm on one or more infrared image frames; and providing one or more low-frequency reference frames based on the performing of the Median-X filtering algorithm.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 9a-9d show an example of an infrared sensor image and processing by the automated test procedure of FIG. 3 in accordance with one or more embodiments of the present invention.

FIGS. 12a-12d show an example of an infrared sensor image and processing by the automated test procedure of FIG. 3 in accordance with one or more embodiments of the present invention.

FIG. 17 shows an example of a routine for using one-dimensional data in accordance with one or more embodiments of the present invention.

FIGS. 18a-18c show examples of infrared image frame data for processing in accordance with one or more embodiments of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
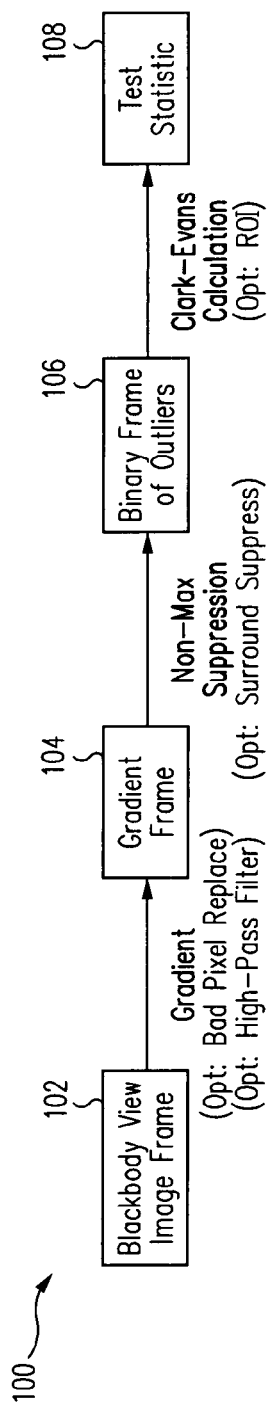
FIG. 1 shows a block diagram illustrating a top level automated test procedure for an infrared sensor in accordance with an embodiment of the present invention.

FIG. 1 shows a block diagram illustrating a top level automated test procedure (ATP) 100 for an infrared sensor in accordance with an embodiment of the present invention. ATP 100 provides an automated routine for detecting image quality defects (e.g., subtle image quality defects) of an infrared sensor, with the automated routine incorporated, for example, into the infrared sensor (or for example infrared camera) manufacturing process to provide a more automated and efficient process for high-volume manufacturing of the infrared sensors.

ATP 100 calculates a gradient frame 104 of an image frame 102 from an infrared sensor, with image frame 102 acquired for example while viewing a uniform blackbody. Image frame 102 may also optionally be processed with various image processing algorithms, such as for example with a bad pixel replacement algorithm or a high-pass filter algorithm. Gradient frame 104 may also optionally be processed with various image processing algorithms (e.g., non-max suppression and/or surround suppression algorithms) to produce the outlier frame 106. The spatial randomness of outliers in an outlier frame 106 based on gradient frame 104 is then assessed.

Image frame 102 would generally be expected to display spatial randomness in the distribution of outliers within outlier frame 106 based on gradient frame 104 if image frame 102 does not contain qualitative visual defects. For example, qualitative visual defects typically manifest themselves as a clumped distribution of outliers in gradient frame 104. A test statistic 108, which for example may be based on a Clark-Evans statistic calculation, is generated to quantify the spatial randomness of outlier distribution in image frame 106 corresponding to gradient frame 104. Additional optional calculations and processing may also be performed and/or the Clark-Evans calculation may also optionally be applied to various regions of interest (ROI) of outlier frame 106.

For example, test statistic 108 based on the Clark-Evans calculation may be normally distributed with a mean of zero and a variance of one. A pattern that displays complete spatial randomness (CSR) would yield a Clark-Evans statistic of zero, with uniform distributions producing positive values of the Clark-Evans statistic, while increasingly clumped distributions producing increasingly negative values.

As set forth further herein, an automated anomaly detection routine is provided based on a sequence of calculations performed to provide a quantitative measure of a given infrared sensor's performance with respect to image quality and compared to one or more performance thresholds.

In general, automated test procedures may be conventionally used to ensure that infrared sensors comply with all specified requirements, such as for example response uniformity, noise-equivalent difference of temperature (NEdT), and operability. However, these conventional test procedures generally would not detect qualitative visual defects (e.g., mountain range, blotch, and other types of visually-detectable defects as discussed further herein) and therefore would pass as acceptable an infrared sensor that a manufacturer would desire to disqualify as defective (e.g., not usable for imaging applications) due to the poor images and image defects provided by the infrared sensor. Consequently, as discussed previously, manual inspection for each infrared sensor is currently performed to prevent infrared sensors with qualitative visual defects from reaching the market.

In contrast in accordance with one or more embodiments of the present invention, automated test procedures are provided to detect visual defects and determine if the corresponding infrared sensor passes or fails the automated inspection or, optionally, if further tests or manual inspection is required. For example in accordance with an embodiment of the present invention, test statistic 108 generally may be a more negative number for images with defects than for images without defects. Therefore, one or more thresholds may be determined (e.g., based on empirical data for one or more image types) for differentiating between good and bad (i.e., defective) infrared sensors or infrared cameras (if testing at the infrared camera level).

Figure 2:
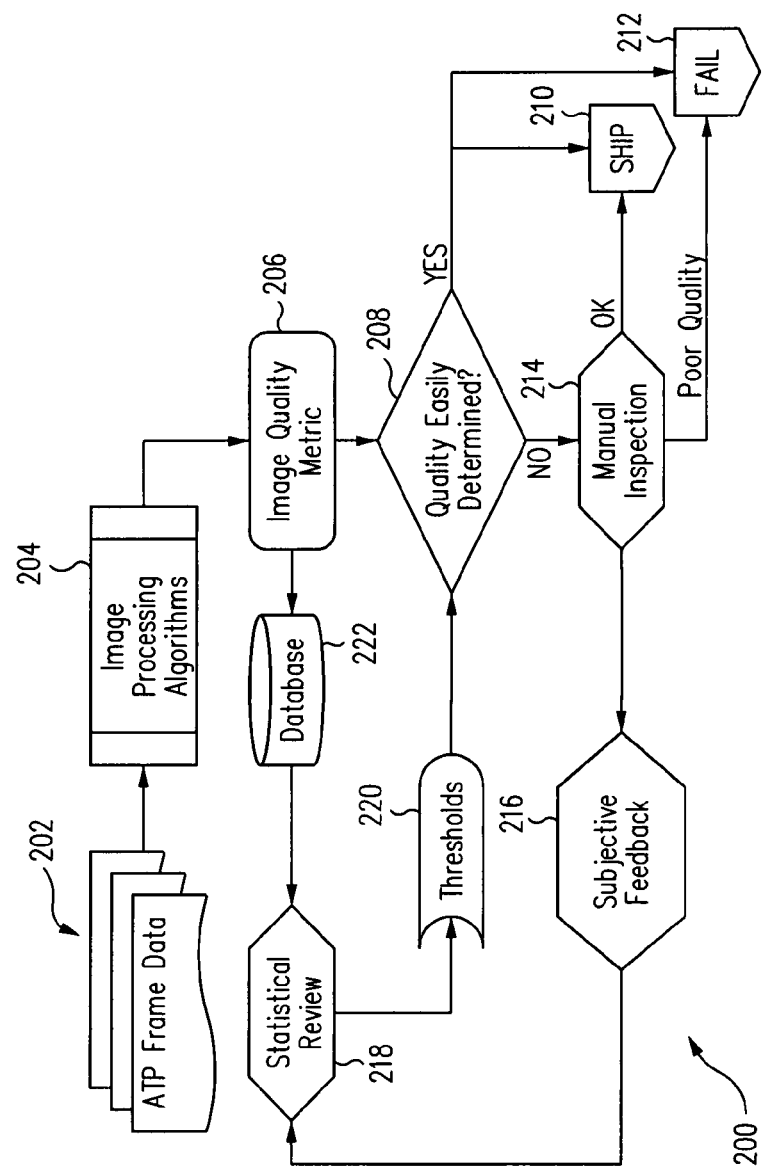
FIG. 2 shows a block diagram illustrating an example of an automated test procedure for an infrared sensor in accordance with an embodiment of the present invention.

For example, FIG. 2 shows a block diagram illustrating an exemplary automated test procedure (ATP) 200 for an infrared sensor in accordance with an embodiment of the present invention. ATP 200 illustrates an automated test system and method for detecting defective infrared sensors due, for example to subtle image quality defects, and represents an exemplary implementation for ATP 100.

ATP 200 processes one or more image frames 202 (e.g., similar to one or more image frames 102 and labeled ATP frame data) from an infrared sensor (e.g., an infrared camera) with image processing 204 to generate an image quality metric 206. Image frames 202 may represent, for example, one or more uniformity and/or responsivity image frames.

Image processing 204 may represent, for example, a computer (e.g., a processor-based system or other type of logic device) executing image processing software algorithms (or other type of instructions), with the computer also optionally storing image frames 202 and resulting frames of data from the image processing. The computer may also be linked to or maintain a database 222 and perform a statistical review 218, thresholds 220 determination, and/or perform other operations of ATP 200. Alternatively, image processing 204 may represent, for example, a portable machine-readable software medium (e.g., optical or magnetic-based media such as a compact disc, a hard drive, or a flash memory) containing image processing software algorithms for execution by a computer or other type of electronic device. Image processing 204 and image quality metric 206 may generate, for example, gradient frame 104, outlier frame 106, and test statistic 108 as discussed in reference to FIG. 1.

Based on image quality metric 206 and one or more thresholds 220, a determination (208) is made as to whether the infrared sensor that generated image frames 202 is defective. If the infrared sensor passes the automated inspection, then the infrared sensor may be sold, shipped, incorporated into a product or system, or otherwise disposed of as desired by the manufacturer (210). If the infrared sensor fails the automated inspection, then the infrared sensor is deemed defective (212).

For determination 208, a single threshold may be used to determine if an infrared sensor is defective. However, using a single cutoff threshold results in the risk of making both type I (i.e., false positive or erroneous good classification) and type II (i.e., false negative or erroneous defective classification) test errors. In general for automated testing, both types of errors should be minimized.

In accordance with an embodiment of the present invention, a single threshold may be used with a specified margin. For example, infrared sensors with corresponding image quality metrics 206 above the single threshold plus specified margin are deemed not defective, while infrared sensors with corresponding image quality metrics 206 below the single threshold minus specified margin are deemed defective. For infrared sensors with corresponding image quality metrics 206 that fall within the specified margin around the single threshold may be further tested manually by test personnel (214).

Alternatively in accordance with an embodiment of the present invention, image-specific dual thresholds may be employed, which may minimize type I and type II errors. For example, infrared sensors (or infrared cameras) having image quality metrics 206 below the first threshold are designated as bad (i.e., defective) and no visual inspection is required (212), while infrared sensors having image quality metrics 206 above the second threshold are passed (i.e., as good or not defective) without requiring a manual visual inspection (214) image review.

However, infrared sensors in the overlap area (determined to be between the thresholds) may be further tested manually by test personnel (214). With dual thresholds (or single threshold plus specified margin), the number of cameras that may need to be inspected manually may be drastically reduced as compared to conventional test techniques, with resulting cost savings and increased manufacturing efficiencies. Manual inspection (214) by trained personnel may be performed to determine whether the infrared sensor, which is not clearly defective and not clearly passable, meets the minimum desired level of image quality (210) or does not meet the minimum desired level of image quality (212). Note that the dual thresholds example may be viewed as corresponding to the single threshold with margin example if one of the dual thresholds is equal to the single threshold plus a specified margin and the other dual threshold is equal to the single threshold minus a specified margin.

One or more thresholds 220 (single, single with specified margins, or dual thresholds) may be generated by statistical review 218 based on information provided by subjective feedback 216 from manual inspection 214 and/or based on image quality metric 206. One or more image quality metrics 206 may be stored in database 222 for access by statistical review 218. For example, thresholds 220 may represent one threshold (with or without specified margins) or more than one threshold (e.g., dual thresholds) for each image frame 202 or for two or more image frames 202.

Figure 4:
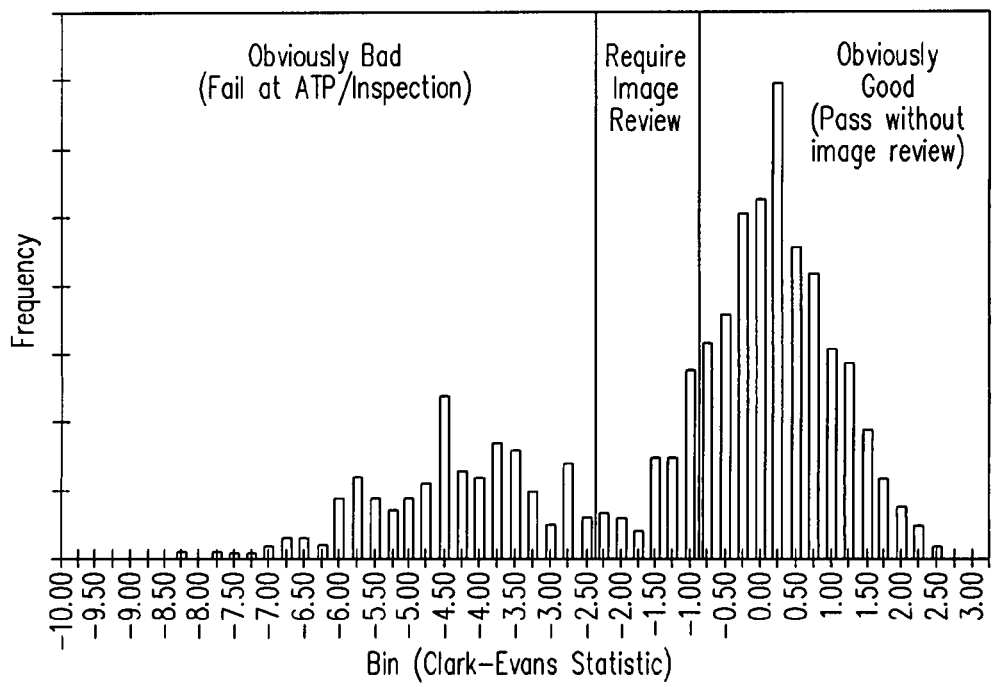
FIG. 4 shows a chart illustrating an example of a histogram of test statistics for the automated test procedure of FIG. 2 in accordance with an embodiment of the present invention.

Referring briefly to FIG. 4, a chart illustrates an exemplary histogram of test statistics for ATP 200 in accordance with an embodiment of the present invention. The chart shows exemplary test results for a number of infrared sensors, with ATP 200 using dual thresholds (220) for determination (208). As can be seen, the majority of infrared sensors were classified as either obviously good or obviously bad (defective), while only a small number of infrared sensors where deemed to require further image review by manual inspection. Consequently, the implementation of dual thresholds greatly reduced the number of infrared sensors requiring manual inspection.

During the manufacturing process of infrared sensors, statistical review 218 may be periodically performed or continually performed to provide the most accurate thresholds based on subjective feedback 216 and image quality metrics 206 stored in database 222. Statistical review 218 may monitor and adjust thresholds 220 to minimize the occurrence of type I errors (i.e., false positive or erroneous good classification) and type II errors (i.e., false negative or erroneous defective classification). Furthermore, statistical review 218 may adjust thresholds 220 to optimize the level of manual inspection against the occurrence of type I and type II errors from a business or cost analysis or based on infrared sensor specifications and requirements.

Figure 3:
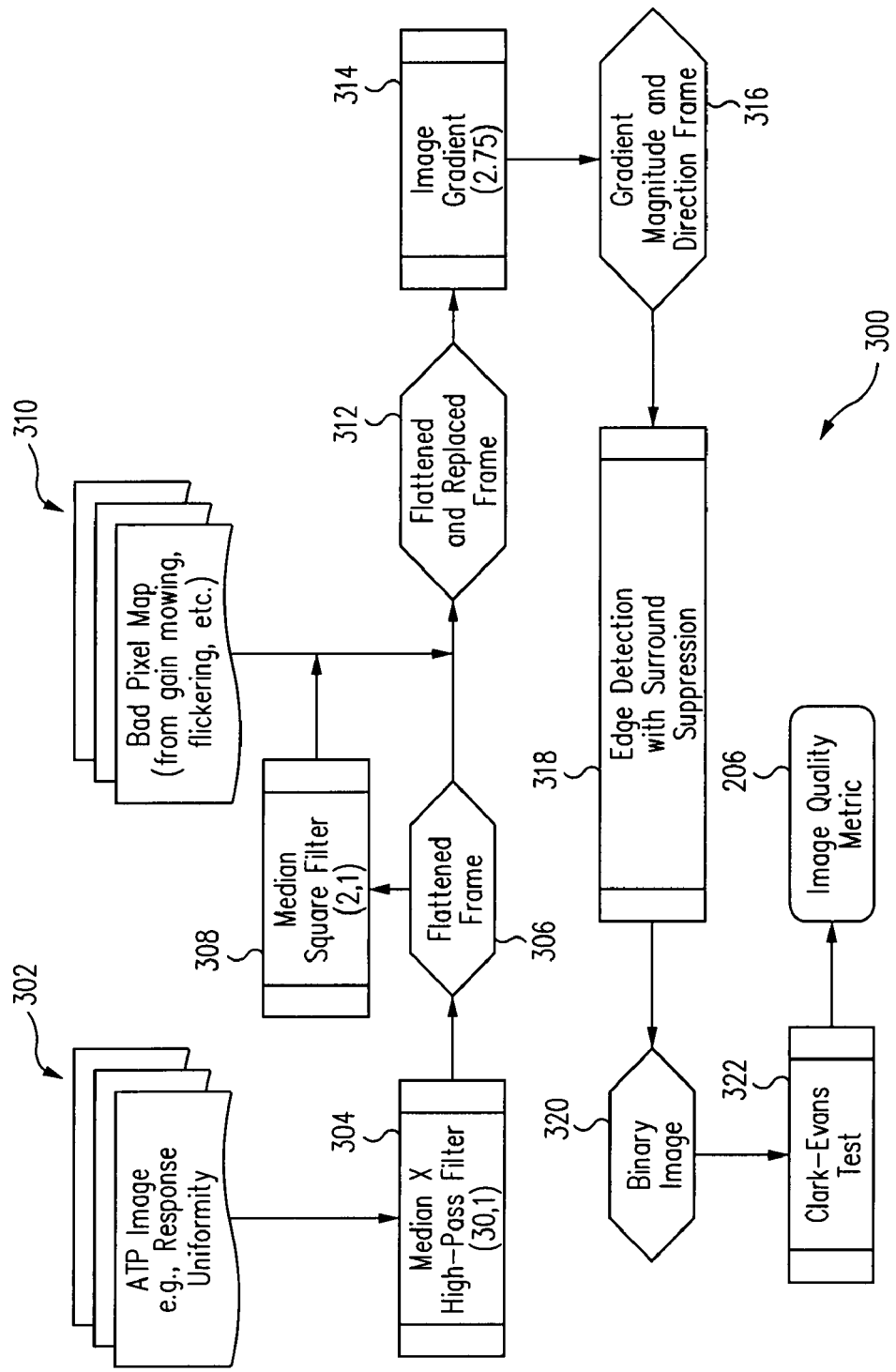
FIG. 3 shows a block diagram illustrating an example of an image processing algorithm for the automated test procedure of FIG. 2 in accordance with an embodiment of the present invention.

FIG. 3 shows a block diagram illustrating an exemplary image processing algorithm (IPA) 300 for image processing 204 to generate image quality metric 206 of FIG. 2 in accordance with an embodiment of the present invention. In general, IPA 300 provides a gradient calculation, with optional high-pass filtering and/or bad-pixel replacement, a non-maximum suppression calculation, with optional edge-detection enhancements, and a Clark-Evans statistic calculation, optionally within a region of interest to provide image quality metric 206.

Specifically, IPA 300 may optionally apply a high-pass filter 304 (e.g., median X high-pass filter with radius 30 and 2 smoothing passes) to one or more image frames 302 (e.g., image frames 202 generated for response uniformity from a blackbody view) to provide a flattened image frame 306. A median square filter (e.g., with radius 2 and 1 smoothing pass) 308 may optionally be applied along with a bad pixel map 310 to replace bad pixels and provide a flattened and replaced image frame 312. An image gradient 314 (e.g., with radius 2.75) is then generated to provide a gradient magnitude and direction frame 316 as shown.

Non-maximum suppression 318, with optional edge detection and surround suppression, is applied to gradient magnitude and direction frame 316 to provide a binary image frame 320. A Clark-Evans test 322 (optionally within a region of interest) is then applied to binary image frame 320 to generate image quality metric 206, which is used as described for ATP 200.

As noted above, high-pass filter 304 may be applied prior to the gradient calculation (e.g., gradient 314 and gradient magnitude and direction frame 316). High-pass filter 304 may optionally be implemented and represent any type of high-pass filter technique, including for example a Median X kernel, a Gaussian kernel mean smoothing, a Gaussian kernel median smoothing, a square kernel mean smoothing, a square kernel median smoothing, a Median 'Cross' kernel smoothing, a FFT-based high-pass spatial filtering, and a smoothing spline subtraction.

As an example in accordance with an embodiment of the present invention, high-pass filter 304 may use a median calculation, with an 'X' pattern for the kernel around each pixel of the infrared sensor instead of all the pixels in a surrounding square as would be understood by one skilled in the art.

Figure 5A:
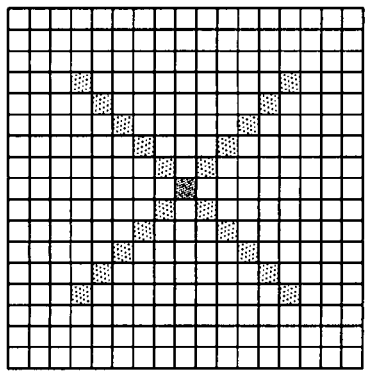
FIGS. 5a and 5b show block diagrams illustrating an example of a high-pass filter implementation for the automated test procedure of FIG. 2 in accordance with one or more embodiments of the present invention.
Figure 5B:
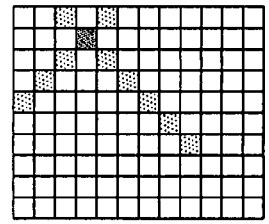

For example, FIGS. 5a and 5b show block diagrams illustrating an exemplary Median 'X' kernel pattern and an exemplary 'Median X' algorithm (summarized below) accepts parameters for kernel radius and number of smoothing passes over the image (MED_X_KERN_RAD, MED_X_N_PASSES). The kernel radius is the number of pixels in each branch of the 'X' pattern, i.e., if the radius is 3, then the 'X' pattern (in the image interior) will consist of 13 pixels. The number of passes indicates the number of times to apply the 'Median X' algorithm to the image, with the output from one iteration on the image being the input to the algorithm on the subsequent pass. Thus, for each pixel in an image, the corresponding pixel in the 'smoothed' image is calculated as the median of the pixels in an 'X' pattern in the original image (including the center pixel). Near the edges of the image, the number of pixels in the kernel may be reduced, as illustrated in FIG. 5b.

The infrared sensor may be any type of infrared radiation detecting device, including a complete infrared camera or system. For example, the infrared sensor may be based on a microbolometer structure, which is typically fabricated on a monolithic silicon substrate to form an array of microbolometers, with each microbolometer functioning as a pixel to produce a two-dimensional image. The change in resistance of each microbolometer is translated into a time-multiplexed electrical signal by circuitry known as the read out integrated circuit (ROIC). The combination of the ROIC and the microbolometer array are commonly known as a microbolometer focal plane array (FPA).

As an example, optimization of images from a microbolometer-based infrared sensor indicates that a Median 'X' kernel radius of 30, with 2 passes, may produce the best filter for anomaly detection. The median frame is calculated and then subtracted from the original image frame to produce a type of high-pass filtered image. Exemplary model parameters for the high-pass filter 304 are shown below.

MED_X_KERN_RAD
Default Value: 30
Description: median X kernel radius in pixels
Limits: 1≦MED_X_KERN_RAD≦~30 (upper limit determined by image size)
MED_X_N_PASSES
Default Value: 2
Description: median X filter number of passes
Limits: 1≦MED_X_KERN_PASS≦~5 (no real upper limit)

An exemplary median square filter algorithm for median square filter 308 may be used to replace any pixels previously identified as bad by conventional methods (e.g., bad pixel map 310). As an example, a square pattern around the central pixel may be used as the kernel. The Median Square filter algorithm also accepts parameters for kernel radius and number of passes (MED_SQ_KERN_RAD, MED_SQ_N_PASSES), with exemplary values of these parameters being a kernel radius of 2 pixels with 1 pass. Exemplary model parameters for median square filter 308 are shown below.

MED_SQ_KERN_RAD
Default Value: 2
Description: median square kernel radius in pixels (used for bad-pixel replacement)
Limits: 1≦MED_SQ_KERN_RAD≦~10 (upper limit determined by image size)
MED_SQ_N_PASSES
Default Value: 1
Description: median square filter number of passes (used for bad-pixel replacement)
Limits: 1≦MED_SQ_KERN_PASS≦~10 (no real upper limit)

The resulting image (flattened and replaced frame 312), which has been filtered and pixel-replaced, is then provided for the gradient calculation (image gradient 314). Various algorithms exist for calculating the gradient of an image, such as algorithms based on finite-difference calculations between adjacent pixels (e.g., Sobel). However, these algorithms are sensitive to image noise and discretization errors, and may not be optimal. In accordance with an embodiment of the present invention, a Gaussian smoothing function may be applied to the image when the gradient is calculated in order to mitigate the effects of noise and discretization. The standard method of convolution may be used, the image 'partial derivative' along each row and down each column may be calculated, and the image gradient estimated from the partial derivatives.

For example, consider the image frame to be a function of two spatial variables f(x, y). Then the gradient of f can be calculated by convolving f with the gradient of a Gaussian smoothing function. The Gaussian smoothing function is parameterized with an extinction coefficient (a) which determines the effective width of the kernel.

$$\nabla f(x, y) = f * \nabla g_\sigma(x, y) \text{ where } g_\sigma(x, y) = \frac{1}{2\pi\sigma^2}\exp\left(-\frac{x^2+y^2}{2\sigma^2}\right)$$

In the current context, it is difficult to apply the convolution efficiently in two dimensions, so the gradient may be estimated by using 'partial derivatives' along the rows and columns.

$$\nabla_x f(x, y) = \left(f * \frac{\partial g_\sigma}{\partial x}\right)(x, y) \text{ and } \nabla_y f(x, y) = \left(f * \frac{\partial g_\sigma}{\partial y}\right)(x, y)$$

In the current application, the convolution of f with the Gaussian smoothing function g is calculated using the Fourier Transform Convolution Theorem as would be understood by one skilled in the art. As an example, the one-dimensional Gaussian function, and its derivative are as follows.

$$g_\sigma(s) = \frac{1}{\sigma\sqrt{2\pi}}\exp\left(-\frac{(s-\mu)^2}{2\sigma^2}\right) \text{ and}$$

$$\frac{dg_\sigma(s)}{ds} = \frac{-(s-\mu)}{\sigma^3\sqrt{2\pi}}\exp\left(-\frac{(s-\mu)^2}{2\sigma^2}\right)$$

Because the convolution is calculated with an FFT, some manipulation of the input data for each row and column is required. A detrending step is applied first. A best-fit line (linear least squares) is determined for the (1-d) input row- or column-data. The input data is then replaced by its residual from the best-fit line. Additionally, some 'padding' is typically required. For example, the number of input data values to the FFT routine must be a (positive) integer power of 2 and, if the number of data values is not an integer power of 2, the data may be padded with zeros at each end to fill out the data set to the nearest integer power of 2. The convolution is calculated with the power-of-2 number of data values, and the 'partial derivative' row or column is extracted from the middle of the convolution output array.

The gradient magnitude and direction are estimated from the 'partial derivatives' by the following.

$$\|\nabla f(x, y)\| = \sqrt{\nabla_x f(x, y)^2 + \nabla_y f(x, y)^2} \text{ and}$$

$$DIR[\nabla f(x, y)] = a\tan\left(\frac{\nabla_y f(x, y)}{\nabla_x f(x, y)}\right)$$

The radius of the gradient kernel is one of the model parameters (GRAD_KERN_RAD) and the exemplary default value is 2.75 pixels. As an example, only the gradient magnitude may be considered or additional edge-detection or feature enhancement algorithms may be employed to utilize the gradient direction. Exemplary model parameters for image gradient 314 and gradient magnitude and direction frame 316 are shown below.

GRAD_KERN_RAD
Default Value: 2.75
Description: gradient smoothing kernel radius in pixels
Limits: 1.0≦GRAD_KERN_RAD≦~10 (upper limit determined by image size)

For non-maximum suppression 318 in accordance with an embodiment of the present invention, an exemplary approach for anomaly detection employs a modified Canny edge detection algorithm. In a blackbody view, for example, a defect-free image would have a homogenous gradient function, where the gradient vector is pointing directly upward at every point in the image. An image with defects, however, would not produce a homogenous gradient. At any point where an anomaly exists, the gradient at that point in the image would diverge from vertical. Thus, large-scale anomalies (e.g., mountain range or blotch) typically manifest themselves as a clumped spatial distribution of outliers in the gradient frame.

Non-maximum suppression 318 may be used to identify points in the image where the gradient diverges from vertical, and in particular where the divergent points lie in some sort of pattern such as an edge and, thus, edge detection routines may provide the desired result. For example, non-maximum suppression 318 takes the gradient magnitude frame as input and produces a binary output frame, where gradient outliers are identified and all other pixels are suppressed.

The Canny edge detection algorithm provides a two-level approach with (1) non-maximum suppression, where gradient values below a low threshold are suppressed and values above a high threshold are maintained, and then (2) hysteresis thresholding, where gradient values between the low and high thresholds are subjected to additional criteria. For example, the additional criteria would maintain gradient values only if they represent a local maximum with respect to surrounding pixels (which would make them part of an edge).

In accordance with an embodiment of the present invention, the threshold limits may be different for every image. For example, this permits the analysis of images from different ATP tests on the same infrared sensor (or infrared camera) and also permits the analysis of images from many different infrared sensors. The thresholds for example may be determined, as would be understood by one skilled in the art, from a histogram of gradient magnitude values.

As an example, a histogram of gradient magnitude values may be generated from the gradient frame. The lower limit of the histogram is always zero, since gradient magnitude is always non-zero. The upper limit of the histogram may be determined from the maximum gradient value in the image. The number of bins in the histogram is a model parameter (N_BINS), and the default value is 50 bins. Exemplary model parameters are shown below.

N_BINS
Default Value: 50
Description: number of bins in the gradient histogram
Limits: 25≦N_BINS≦~100 (upper limit determined by image size)

LO_HIST
Default Value: 2.75
Description: lower histogram threshold factor
Limits: 0≦LO_HIST≦~3.0 (upper limit determined by gradient histogram)

HI_HIST
Default Value: 3.50
Description: upper histogram threshold factor
Limits: LO_HIST<HI_HIST≦~5.0 (upper limit determined by gradient histogram)

To determine cutoff thresholds, a continuous model for example may be fitted to the discrete histogram data, with threshold limits determined from the continuous curve. For example, referring briefly to FIGS. 7a-7d, exemplary histograms of gradient magnitude values, along with the corresponding continuous models, are illustrated for various exemplary types of image defects or image test responses (blotch, mountain range, uniformity, and responsivity, respectively). A histogram of image gradient magnitude values is useful for non-maximum suppression with hysteresis thresholding. As illustrated in FIGS. 7a-7d, a continuous curve is fitted to the histogram data, which may then be used to determine thresholds.

For example, the continuous model for a gradient magnitude histogram is determined by non-linear least squares curve fit with the following function.

$$f(x) = A \cdot x \cdot \exp(-B \cdot x^2)$$

Values for the coefficients A and B may be determined numerically, as would be understood by one skilled in the art. The continuous curve may then be used to establish threshold values by using the curve peak and point of inflection as reference points (e.g., as in a standard normal curve). The curve peak and inflection point may be determined from the following.

$$\text{peak: } x = \frac{1}{\sqrt{2B}}$$

$$\text{inflection point: } x = \frac{3}{\sqrt{6B}}$$

The distance from the peak to the inflection point may be used in the same sense as in a standard normal distribution (i.e., the distance from the peak to the inflection point is exactly one standard deviation). For example, the low and high cutoff thresholds may be calculated from the continuous curve peak and inflection point as follows, where 0≦LO_HIST<HI_HIST are factors that determine the distances away from the peak where each threshold lies.

$$\text{low: } x = \frac{1}{\sqrt{2B}} + \text{LO\_HIST} * \left(\frac{\sqrt{2} - \sqrt{6}}{2\sqrt{B}}\right)$$

$$\text{high: } x = \frac{1}{\sqrt{2B}} + \text{HI\_HIST} * \left(\frac{\sqrt{2}-\sqrt{6}}{2\sqrt{B}}\right)$$

Values of the gradient magnitude below the low cutoff are immediately suppressed, while values above the high cutoff are always retained. Values between the two cutoffs, for example, may only be maintained if they represent a local maximum with respect to the surrounding pixels. For example, a default value for LO_HIST and HI_HIST may each be 3.50.

The Clark-Evans statistic, from Clark-Evan test 322 (FIG. 3), provides a numerical measure of the spatial randomness of a distribution of points within a specified domain. This statistic is normally distributed with mean zero and variance one (standard normal distribution). A pattern that displays complete spatial randomness (CSR) would yield a Clark-Evans statistic of zero.

Figure 6A:
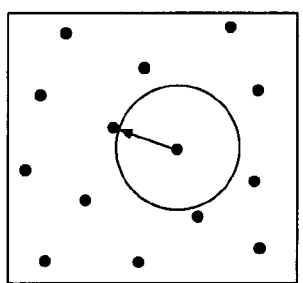
FIGS. 6a-6c show block diagrams illustrating examples of infrared sensor defect patterns in accordance with an embodiment of the present invention.
Figure 6B:
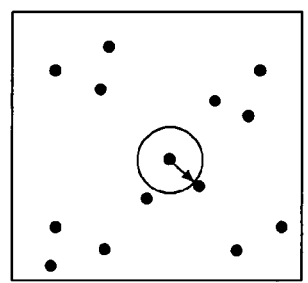

For example, FIGS. 6a and 6b generally depict spatial patterns that do not display CSR. Distributions that are more uniform than random (e.g., as illustrated in FIG. 6a) would tend to produce positive values of the Clark-Evans statistic, while more clumped distributions (e.g., as illustrated in FIG. 6b) would tend to produce increasingly negative values.

As an example, defect-free images should be expected to produce random or uniform patterns from the spatial distribution of gradient magnitude outliers. Images with defects should produce more clustered or clumped patterns. Consequently, the Clark-Evans statistic will effectively separate images with defects from images without defects, with any overlap for example resolved with manual inspection.

Clark-Evans test 322 may be based on nearest-neighbor distances. For each point in a binary image pattern, there is a unique straight-line distance that denotes the minimum distance to the closest point (or points) in the pattern. For a set of points within the image frame domain, let the complete set of nearest-neighbor distances be denoted as follows.

$$D=\{D_1,D_2,K,D_n\}$$

The average point density within the image frame domain is just the total number of points divided by the area of the frame as in the following.

$$\lambda = \frac{n}{nRows \cdot nCols}$$

The point density becomes a reference point for determining what the average nearest neighbor distance should be if the spatial distribution of points are randomly dispersed within the image. The calculated 'average' of nearest-neighbor distances in the binary image should be comparable to the expected value for a given point density, as set forth for the Clark-Evans test for spatial randomness. However, it may not be sufficient to just calculate the average nearest neighbor distance from the complete set of distances, because the distance values in the complete set are not independent as the two points that are close together will likely have the same nearest-neighbor distance. Thus, in order to make a valid comparison between the expected value and the measured value, the central limit theorem may be used. Random samples of size m, where m<n, are taken from the set D of nearest neighbor distances, and the sample set is averaged as shown below.

$$\bar{d}_m = \frac{1}{m} \cdot \sum_{i=1}^{m} d_i$$

Figure 6C:
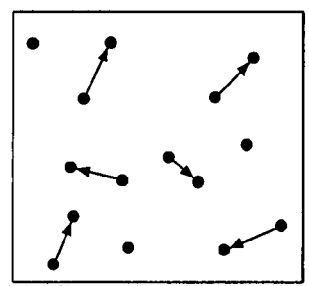
Figure 7A:
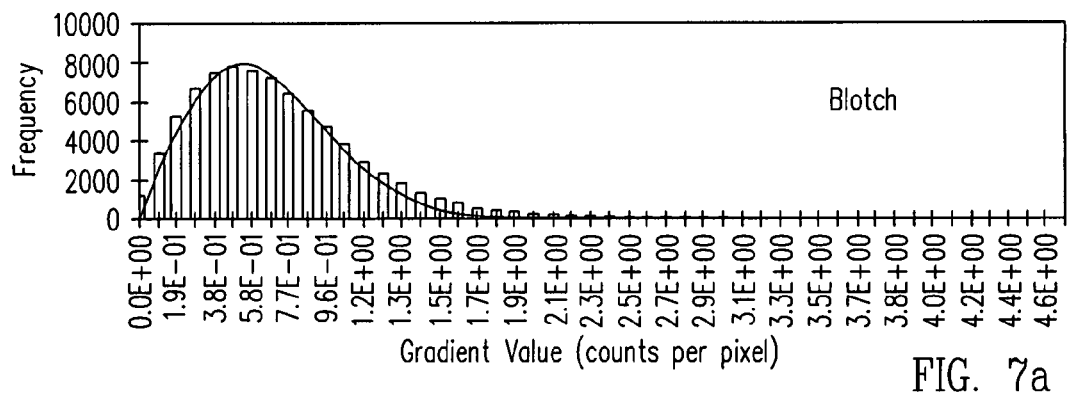
FIGS. 7a-7d show charts illustrating examples of histograms of image gradient values for various types of infrared sensor blackbody images in accordance with one or more embodiments of the present invention.
Figure 7B:
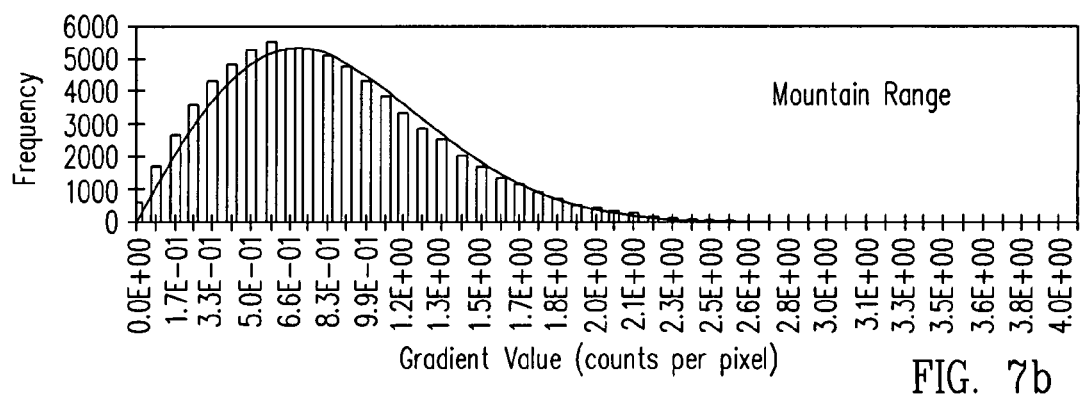
Figure 7C:
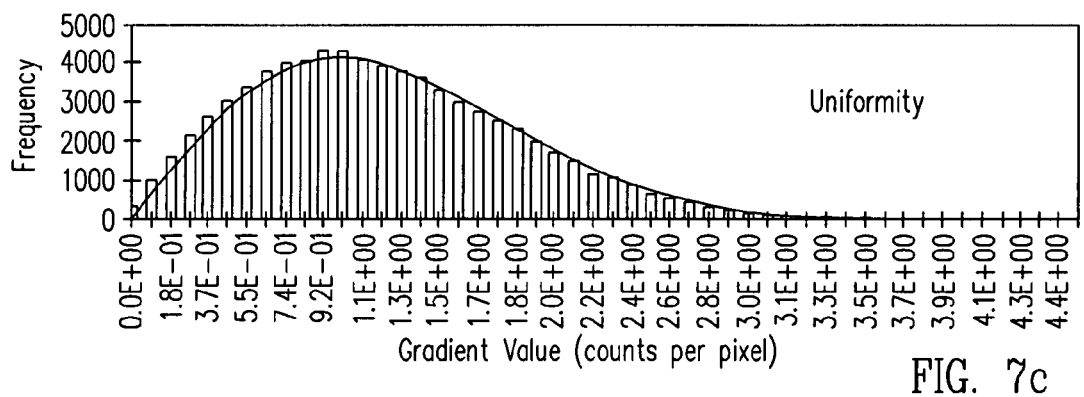
Figure 7D:
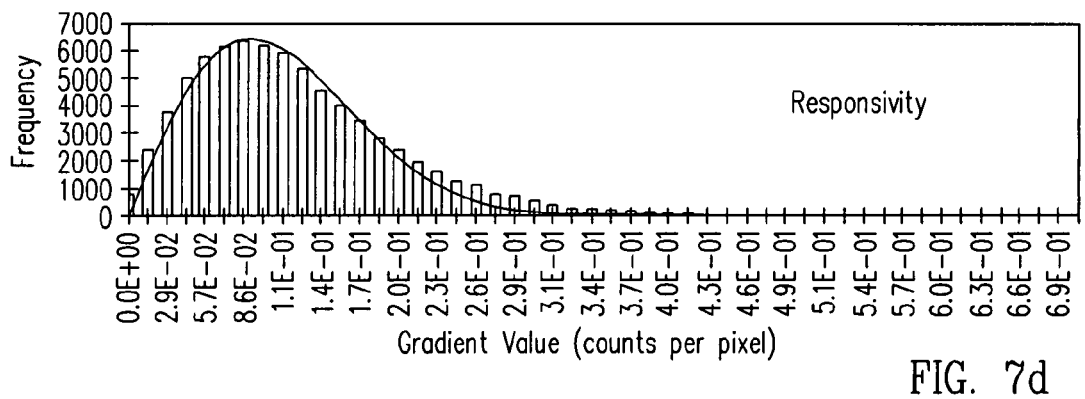

This produces a random variable $\bar{d}_m$ that is normally distributed according to the central limit theorem. A series of random samples are made, as illustrated in FIG. 6c, and the mean of the sample averages is used for comparison with the expected value. Thus, as shown for FIG. 6c, the Clark-Evans statistic is based on a characterization of nearest-neighbor distances, where random samples from the complete set of nearest-neighbor distances are made, with the distribution of sample means being normal according to the central limit theorem.

The following conversion below creates a standard normal variate from the mean of sample averages, which is the Clark-Evans statistic. The number of random sub-samples is a model parameter (N_RAND_ITER), with for example a current default value of 50 iterations. For each of the sampling iterations, for example, ten percent of the points in the binary image frame are sampled. Thus for this example, the value of m is ten percent of the number of (non-suppressed) points in the binary image. In other words, ten percent of the points are sampled, with this sampling repeated N_RAND_ITER times.

$$z_m = \frac{\bar{d}_m - \frac{1}{2\sqrt{\lambda}}}{\sqrt{\frac{4-\pi}{4\pi m \lambda}}} \sim N(0,1)$$

Because the smoothing function is susceptible to edge effects, an additional parameter may be employed (N_BORDER) to allow a border frame around the region of interest for Clark-Evans calculations. This parameter is the width of the border, in number of pixels, with for example a current default value of 30. Points in the border area of the binary image are ignored for purposes of calculating the Clark-Evans statistic.

The final model parameter (DIST_TABLE_SIZE) is the number of elements in the distance table used for nearest-neighbor calculations. The distance table is used to speed calculation time of nearest neighbor and may be used as a spiral-outward search for the nearest neighbor, storing the distances of pixels in every location in the outward path. This distance table may slow compilation time, but may provide run-time efficiency. Exemplary model parameters for Clark-Evans Test 322 are shown below.

N_RAND_ITER
Default Value: 50
Description: number of random iterations for Clark-Evans
Limits: 25≦N_RAND_ITER≦~250 (no real upper limit)
N_BORDER
Default Value: 30
Description: number of pixels to ignore around the border in Clark-Evans
Limits: 0≦N_BORDER≦~30 (upper limit determined by image size)
DIST_TABLE_SIZE
Default Value: 5525
Description: the number of elements in the distance table for nearest-neighbor (Clark-Evans)

Limits: this is determined by pre-set size of distance table, which may be hard-coded In accordance with one or more embodiments of the present invention, automated test procedures as set forth herein were applied to various exemplary infrared sensor images with and without defects (e.g., defects that may not be detected by conventional automated procedures that provide infrared sensor test metrics such as uniformity). For example, FIGS. 8a-8d show exemplary infrared sensor images for processing by ATP 200 of FIG. 2 in accordance with one or more embodiments of the present invention.

Figure 8B:
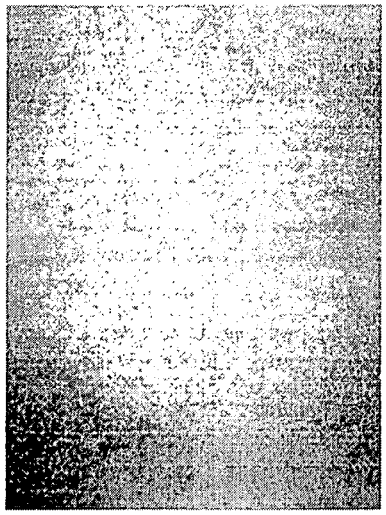
FIGS. 8a-8d show examples of infrared sensor images for processing by the automated test procedure of FIG. 2 in accordance with one or more embodiments of the present invention.
Figure 8D:
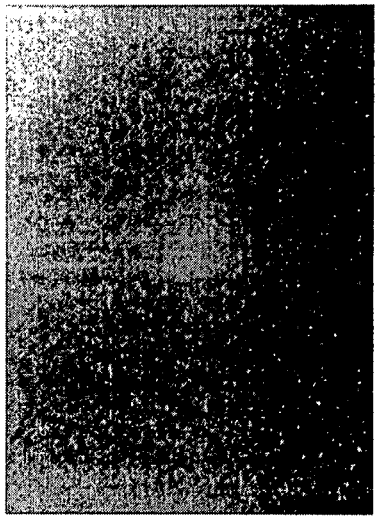
Figure 8A:
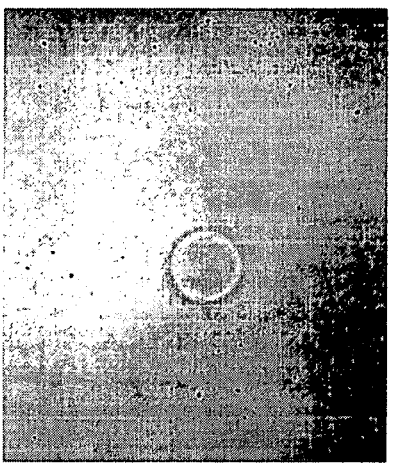

Specifically, FIG. 8a shows a responsivity map from infrared sensor-level testing, which illustrates a defect caused by debris on the infrared sensor window (this type of defect also referred to herein as a blotch). FIG. 8b shows an offset uniformity map from an infrared camera-level ATP illustrating a 'mountain range' defect. This defect is difficult to detect with uniformity tests, because the signal difference across the demarcation defect is only a few counts. This type of defect may arise from thermal non-uniformities in the chamber during the calibration process.

Figure 8C:
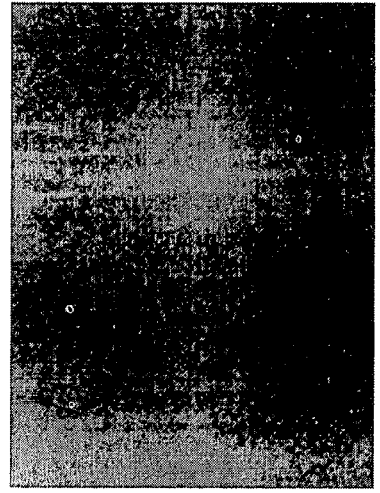

FIG. 8c shows a responsivity uniformity map from infrared sensor-level testing illustrating no apparent defects. The cluster in the upper-left portion of the image is smaller than what may generally be considered an image quality defect for the infrared sensor. FIG. 8d shows a high-scene corrected uniformity map from infrared camera-level ATP illustrating no apparent visual defects. Generally defect-free images, such as shown in FIGS. 8c and 8d were used as controls to test ATP 200.

FIGS. 9a-9d show exemplary ATP processing (e.g., ATP 200) of the infrared sensor image of FIG. 8a in accordance with one or more embodiments of the present invention. For example, FIG. 9a shows the raw responsivity map, which typically would pass quantitative tests for uniformity and would require manual inspection to detect the infrared sensor defect. FIG. 9b shows a flattened image frame produced by applying a high-pass filter to the raw responsivity map, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

FIG. 9c shows the gradient magnitude calculated from the flattened image frame, with outliers in this frame identified using a modified Canny edge detection algorithm to produce a binary frame. FIG. 9d shows the final binary image after non-maximum suppression with hysteresis thresholding. The value of the Clark-Evans statistic for this binary image may be −9.0 (border frame of 30 pixels).

Figure 10A:
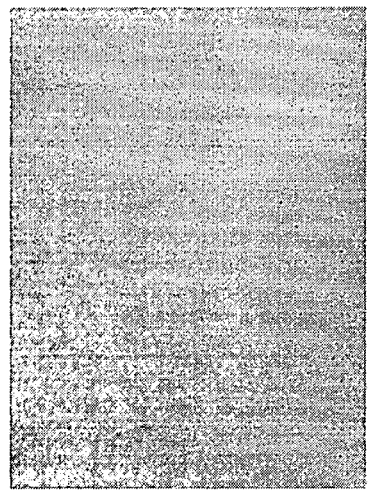
FIGS. 10a-10d show an example of an infrared sensor image and processing by the automated test procedure of FIG. 3 in accordance with one or more embodiments of the present invention.
Figure 10B:

FIGS. 10a-10d show exemplary ATP processing (e.g., ATP 200) of the infrared sensor image of FIG. 8b in accordance with one or more embodiments of the present invention. For example, FIG. 10a shows a raw offset uniformity map with the mountain range defect, which has obvious quality defects but typically would pass conventional quantitative tests for uniformity. FIG. 10b shows a flattened image frame produced by applying a high-pass filter to the raw offset uniformity map, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

Figure 10C:
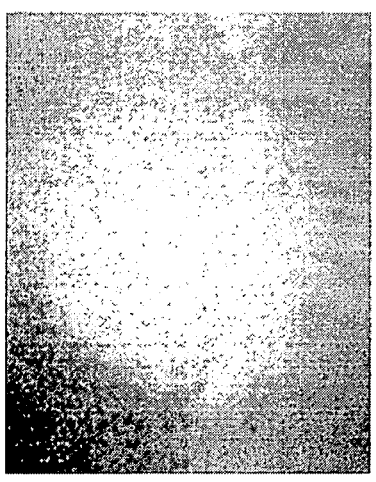
Figure 10D:
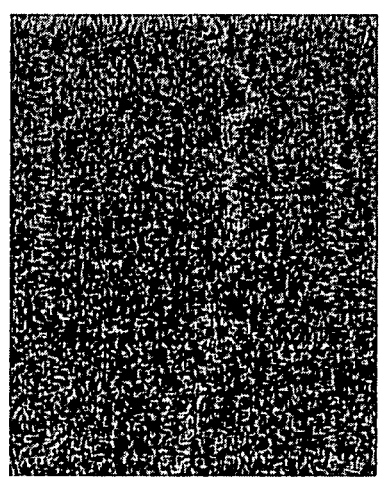

FIG. 10c shows the gradient magnitude calculated from the flattened image frame, with outliers in this frame identified using a modified Canny edge detection algorithm to produce a binary frame. FIG. 10d shows the final binary image after non-maximum suppression with hysteresis thresholding. The value of the Clark-Evans statistic for this binary image may be −5.5 (border frame of 30 pixels).

Figure 11B:
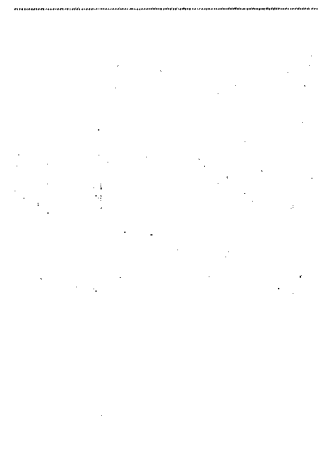
FIGS. 11a-11d show an example of an infrared sensor image and processing by the automated test procedure of FIG. 3 in accordance with one or more embodiments of the present invention.
Figure 11D:
Figure 11A:
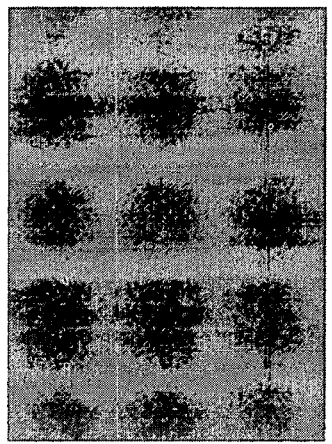

FIGS. 11a-11d show exemplary ATP processing (e.g., ATP 200) of the infrared sensor image of FIG. 8c in accordance with one or more embodiments of the present invention. For example, FIG. 11a shows an offset uniformity map with no apparent quality defects (e.g., generally the clusters in the image are too small to be detected). FIG. 11b shows a flattened image frame produced by applying a high-pass filter to the responsivity map of FIG. 11a, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

Figure 11C:
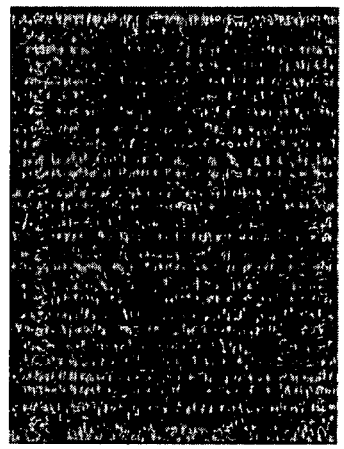

FIG. 11c shows the gradient magnitude calculated from the flattened image frame, with outliers in this frame identified using a modified Canny edge detection algorithm to produce a binary frame. FIG. 11d shows the final binary image after non-maximum suppression with hysteresis thresholding. The value of the Clark-Evans statistic for this binary image may be −2.0 (border frame of 30 pixels) and may be subject to manual inspection (e.g., per the exemplary chart in FIG. 4).

FIGS. 12a-12d show exemplary ATP processing (e.g., ATP 200) of the infrared sensor image of FIG. 8d in accordance with one or more embodiments of the present invention. For example, FIG. 12a shows a raw offset uniformity map (FIG. 8d) with no apparent quality defects and may be used as a control to determine whether the algorithms and image quality metric flag this image as suspect or defective. FIG. 12b shows a flattened image frame produced by applying a high-pass filter to the raw offset uniformity map, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

FIG. 12c shows the gradient magnitude calculated from the flattened image frame, with outliers in this frame identified using a modified Canny edge detection algorithm to produce a binary frame. FIG. 12d shows the final binary image after non-maximum suppression with hysteresis thresholding. The value of the Clark-Evans statistic for this binary image may be 0.0 (border frame of 30 pixels) and would pass as obviously good (e.g., per the exemplary chart in FIG. 4).

As noted previously in accordance with an embodiment of the present invention, a Median-X kernel pattern may be used to provide a high-pass filtering operation (e.g., as discussed in reference to FIGS. 5a and 5b). Furthermore in accordance with one or more embodiments of the present invention, a Median-X filter may be used to provide a versatile filter for a variety of operations associated with infrared camera calibration and test and general infrared image processing. As a specific example in accordance with an embodiment, the Median-X filter may be used for the identification of anomalous pixels, with the Median-X filter generally immune to the effects of noisy pixels that are common in infrared images.

In general, the process of calibrating an infrared camera may include identification of defective and anomalous pixels. During this process, the camera typically views a uniform blackbody source that completely fills the camera aperture. In an idealized (but unrealistic) scenario, when viewing the uniform scene, every pixel in the frame would produce the same output. In reality, however, infrared images of flat scenes will inherently have significant frame curvature due for example to optical design (e.g., aperture warping, also known as $\cos^4$ fall-off). Other fixed-pattern spatial noise may also be present. Additionally, temporal noise is generally always superimposed on the frame.

As an example, individual pixels, or small groups of adjacent pixels, may be damaged or rendered inoperative, leading to spikes in the infrared image data. These noise components may be illustrated for example in FIG. 13a, which shows generally a three-dimensional view of a simulated infrared image frame when viewing a uniform blackbody. The curvature in the simulated infrared image frame may be due for example to aperture warping and several anomalous pixels (identified as pixel values 1302(1) and 1302(2)) have been included in FIG. 13a for illustration.

Even though these noise manifestations are generally well-known, some early anomalous pixel tests compared the intensity (or some other characteristic) of individual pixels to a flat, frame-wide spatial average, with exclusion limits based on a frame-wide spatial standard deviation. Pixels that differed significantly from the frame-wide average were deemed bad. Comparing individual pixels to a flat frame-wide average, for example, may have the disadvantage of incorrectly identifying many good pixels as being bad (referred to herein as "False Positive" or Type I errors), particularly in the corners, as illustrated in FIG. 13b. Additionally, the flat frame average is susceptible to "False Negative" or Type II errors, because the flat exclusion limits allow some anomalous pixels (identified as pixel values 1302(3) and 1302(4)) to pass through undetected, as shown in FIG. 13b.

Figure 13A:
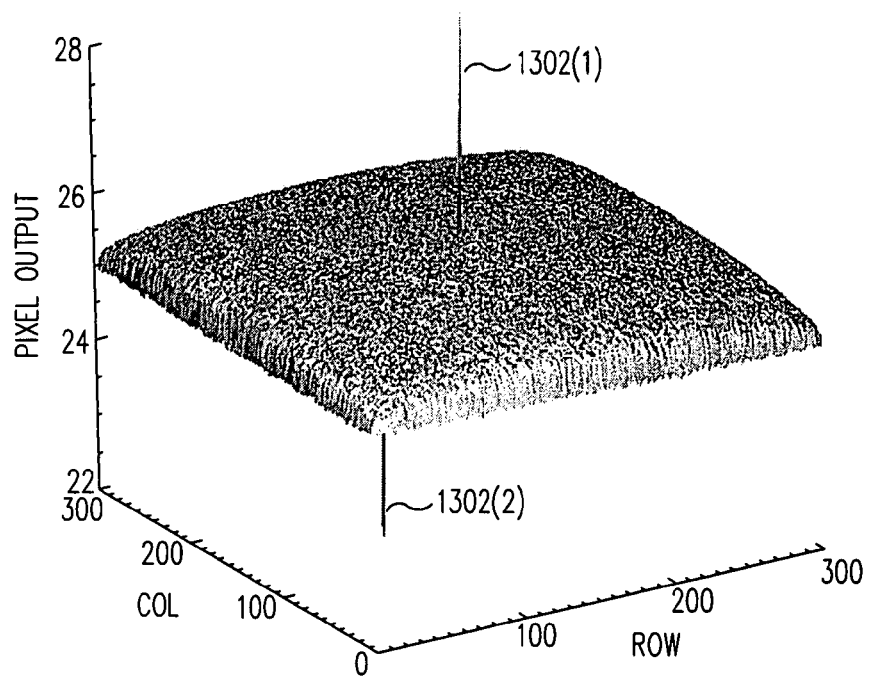
FIGS. 13a-13c show examples of infrared sensor image frames and processing in accordance with one or more embodiments of the present invention.
Figure 13B:
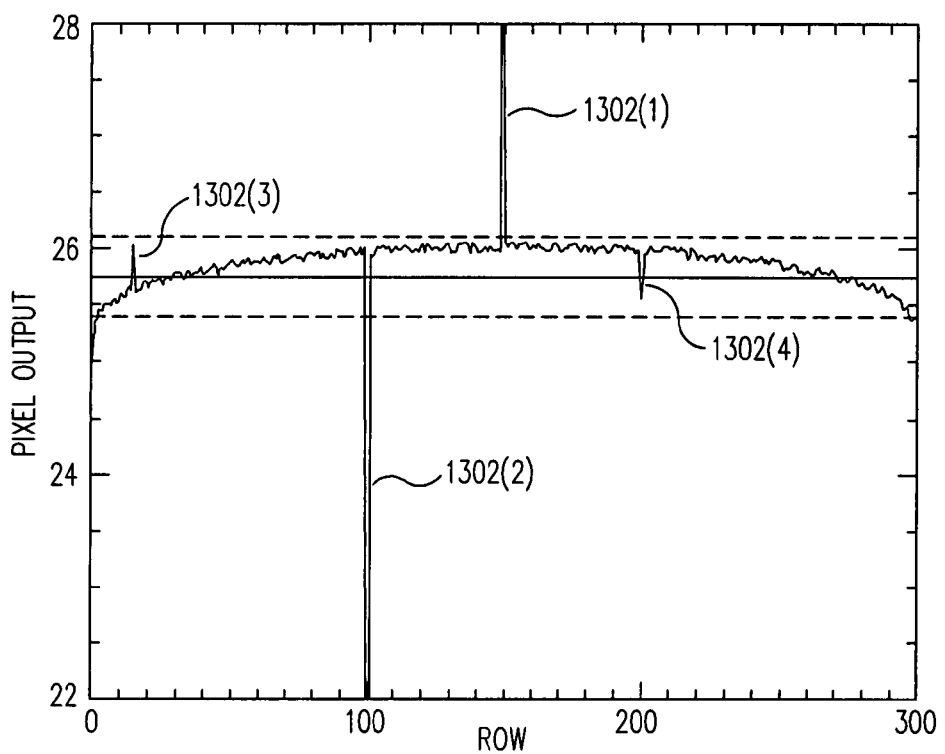

Specifically, FIG. 13b represents a "cross-section" along one column of the simulated infrared image frame shown in FIG. 13a. Aperture warping is shown as the gradual tailing off of the image near the edges. One railed (pixel value 1302(1)) and one dead pixel (pixel value 1302(2)) are shown, with both exceeding the scale of the graph axes. Two anomalous pixels (pixel values 1302(3) and 1302(4)) are shown that are not detected by the flat limits (thus false negative, or Type II errors). As illustrated in FIG. 13b, the flat limits will also identify the column endpoints as bad (thus false positive, or Type I errors).

To limit the occurrence of Type I and Type II errors that may arise when comparing individual pixels to a flat frame, a curved reference frame may be calculated. This may be accomplished by using some form of low-pass filter, with the filter applied to the raw frame to produce a filtered frame that represents the low spatial frequency components in the raw frame. The anomalous pixel test then compares individual pixel values to the curved reference frame, with exclusion limits based on the curved reference and spatial standard deviation in the original frame.

In general, low-frequency reference frames may be preferred over the flat-frame reference in anomalous pixel tests. For example, one common filter used to produce low-frequency frames consists of a 'smoothing kernel'. This algorithm applies a weighted average (or weighted arithmetic mean) of all pixels within a kernel area surrounding the central pixel to calculate the value at each pixel location in the reference frame. In most instances, this algorithm acts as a low-pass filter to produce a curved frame average suitable for anomalous pixel determination. However, in cases where individual defective pixels display extremely high or low numerical values, the smoothing kernel produces uncharacteristically high or low values in reference frame pixels adjacent to the defects, an effect termed 'tent poles' or 'blooming'. When pixels in the original image adjacent to the defects are then compared to the reference frame, the anomalous pixel test incorrectly identifies them as defective because of the 'tent pole' around the defect in the reference frame. This has the undesirable effect of 'growing' clusters of defective pixels around otherwise isolated defective pixels.

Improvements to the weighted-average filter were required to reduce Type I errors and to overcome the 'blooming' limitations of the smoothing kernel. However for example, a filtering algorithm that may work well for a slow-pixel test (e.g., successfully eliminating 'tent poles' around isolated bad pixels) may give mixed results for odd-pixel tests, particularly near the edges of some images. In particular, this filtering algorithm may provide poor Type I error performance for some images. Consequently, a more robust algorithm was developed, referred to herein as the Median-X filter in accordance with one or more embodiments, which may be applied universally for all anomalous pixel tests.

Specifically in accordance with one or more embodiments, the Median-X filter was developed to provide a low-frequency reference frame that may be used for all anomalous pixel tests, and which may minimize Type I and Type II errors for bad-pixel identification. This Median-X filter approach uses the median value of the kernel set, instead of the arithmetic mean, because the median calculation is not as susceptible to extreme outliers as the arithmetic mean. The Median-X filter also uses an 'X' pattern for the kernel around each pixel, instead of using all the pixels in a surrounding square or other area around the central pixel. This 'X' pattern is designed to mitigate the effects of row and column noise, which typically plague infrared images. In general, area kernels are more susceptible to skewing by row and column noise, even if they use the median value, while using the median value of an 'X'-shaped kernel typically results in optimal filter performance with regard to Type I and Type II error performance in bad-pixel tests.

Figure 13C:
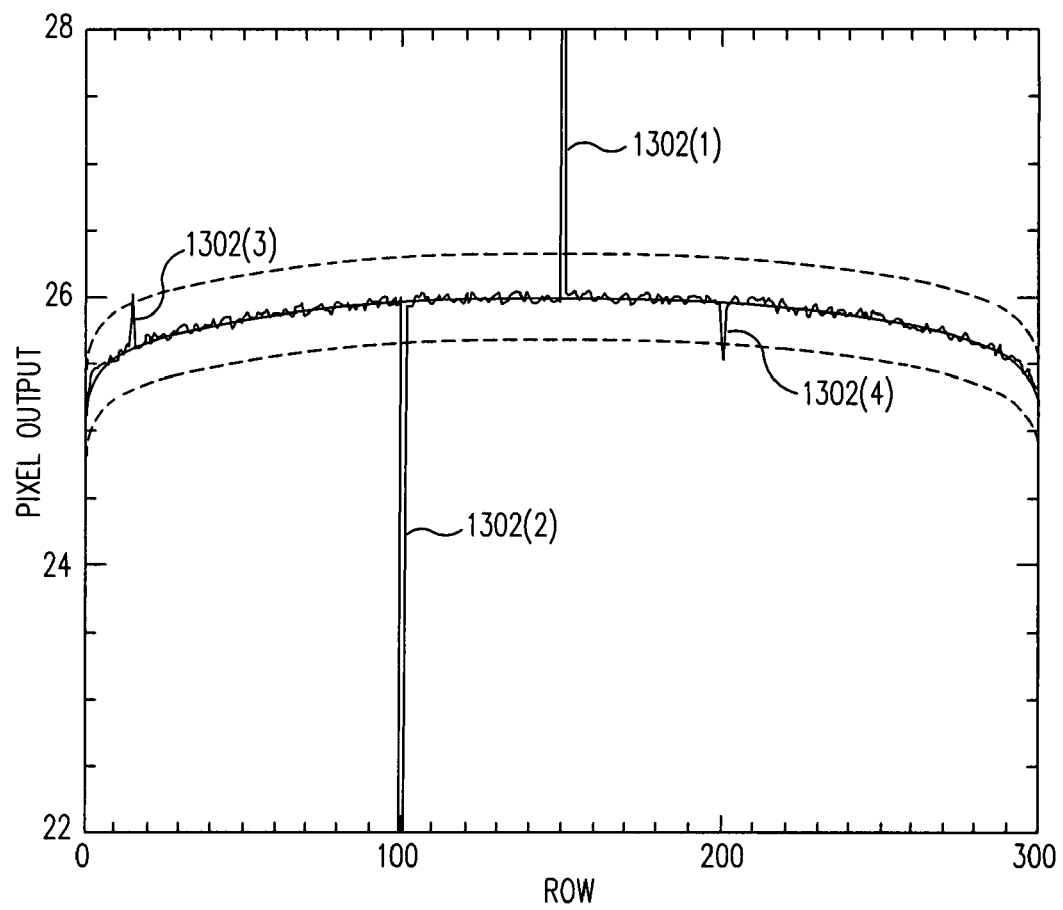

Specifically for example in accordance with an embodiment of the present invention, FIG. 13c shows as an example of the same cross-section as shown in FIG. 13b, but with exclusion limits calculated using the Median-X filter. The two anomalous pixels (pixel values 1302(3) and 1302(4)) previously shown that were not detected by the flat limits are now identified as bad (e.g., exceeding the limits). Furthermore, the column endpoints that were previously identified as bad (as discussed in reference to FIG. 13b) are now passing, as illustrated in FIG. 13c, using the Median-X filter approach.

This Median-X filter may also provide the added benefit of reduced calculation time at each pixel, because the median value need only be calculated for a small set of pixels in the 'X' kernel. The median calculation may also be streamlined by selecting the $k^{th}$ largest element in the kernel set and thus, complete sorting of the kernel set is not required for this application. Thus, in accordance with an embodiment, this feature may result in the feasibility of using the Median-X filter in camera-level applications (e.g., implemented within an infrared camera rather than in separate image processing test equipment). For example, because the Median-X filter algorithm is efficient and only requires a small amount of memory, the Median-X filter may be implemented in software or firmware that is delivered with the infrared camera. As an example, possible applications may include detail enhancement, flat-field correction, operational bad-pixel detection, and/or scene object detection.

The Median-X filter may be applied for example to one, two, or three-dimensional data in accordance with one or more embodiments of the present invention. As an example, the Median-X filter may be applied to two-dimensional image data, such as shown for a single image frame in FIGS. 5a and 5b and which represents a spatial filtering of the frame data. For this specific example, the Median-X kernel pattern for two-dimensional data, such as single image frames, is shown in FIG. 5a as having a radius of 5 pixels. For each pixel in an image, the corresponding pixel in the low-frequency reference frame may be calculated as the median of the pixels in an 'X' pattern from the original image (including the center pixel). Near the edges, the number of pixels in the kernel may be reduced, as shown in FIG. 5b. For the full 'X' pattern, the kernel may include an odd number of pixels, regardless of the kernel radius, but near the edges of the image, the kernel may include an even number of pixels.

Figure 14:
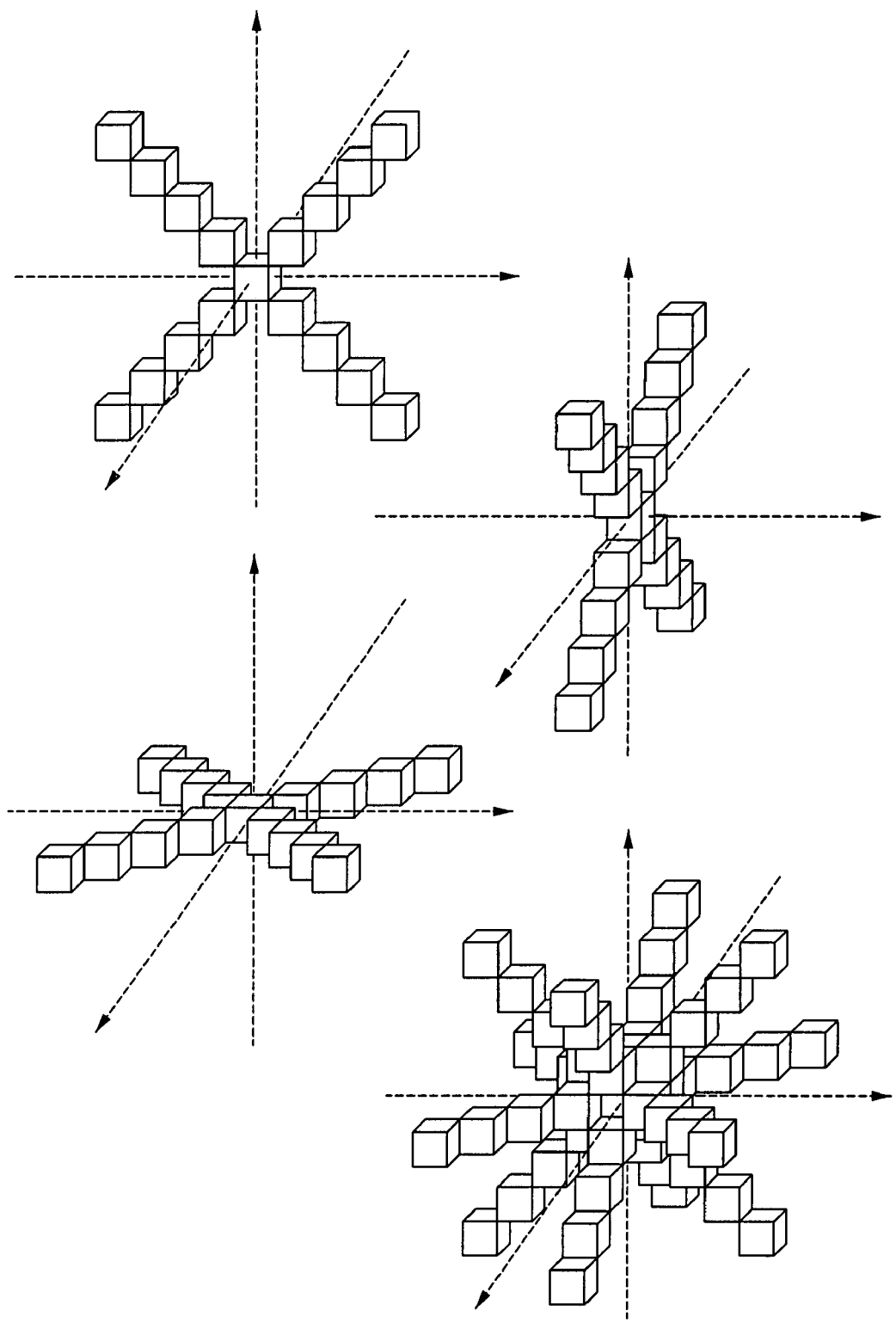
FIG. 14 shows an example of a Median-Star kernel for three-dimensional data in accordance with one or more embodiments of the present invention.

The Median-X filter concept may be extended to lower or higher dimensional data, such as for example to a sequence of image frames of three-dimensional image data. For this example in accordance with an embodiment, the branches of the 'X' pattern may be extended into the third dimension (e.g., within each of the coordinate planes), resulting in a "Median-Star" pattern as shown in FIG. 14. Specifically for this example, the 'Median Star' kernel pattern for three-dimensional data provides a symmetric radius of five pixels in every axis (i.e., the 'X' pattern is designated in each of the coordinate planes as illustrated in FIG. 14). However, it should be understood that each 'X' pattern may have a distinct radius in each plane in accordance with some embodiments, resulting in an asymmetric kernel In general, the Median-X filter (which may refer generally also to the specific Median-Star filter pattern and other variations of this filter implementation) may represent a spatial-temporal filtering of the image frame sequence. The end result from the application of the Median-X filter, for example, is an image frame or sequence of image frames that contain only the low-frequency components of the original data. In the two-dimensional application, the Median-X filter algorithm for example may robustly handle extreme-valued pixels as well as row and column noise that are common in infrared images. In the three-dimensional application, the filter may also be impervious to flickering pixels, slow pixels, 'popcorn' or 'blinker' type of pixels, and/or 1/f temporal noise, which may be present in infrared image data. The advantage of the three-dimensional Median-X filter implementation, for example, may be an added robustness to temporal noise sources.

The Median-X filter algorithm may be provided with various parameters in accordance with one or more embodiments. The parameters may include, for example, number of image frames, number of image rows and columns, kernel radius, and number of smoothing passes over the image. The kernel radius refers to the number of pixels in each branch of the 'X' pattern. For example, if the kernel radius is three, then the 'X' pattern (e.g., in the image interior) may consist of thirteen pixels. The Median-X filter algorithm may be used successively, for example, by directing the output of one pass of the Median-X filter to be used as the Median-X filter input for the next pass (e.g., the output of one iteration on the image becomes the input to the Median-X filter algorithm on the subsequent pass). The number of passes indicates the number of times to apply the Median-X filter algorithm to the image.

Figure 15:
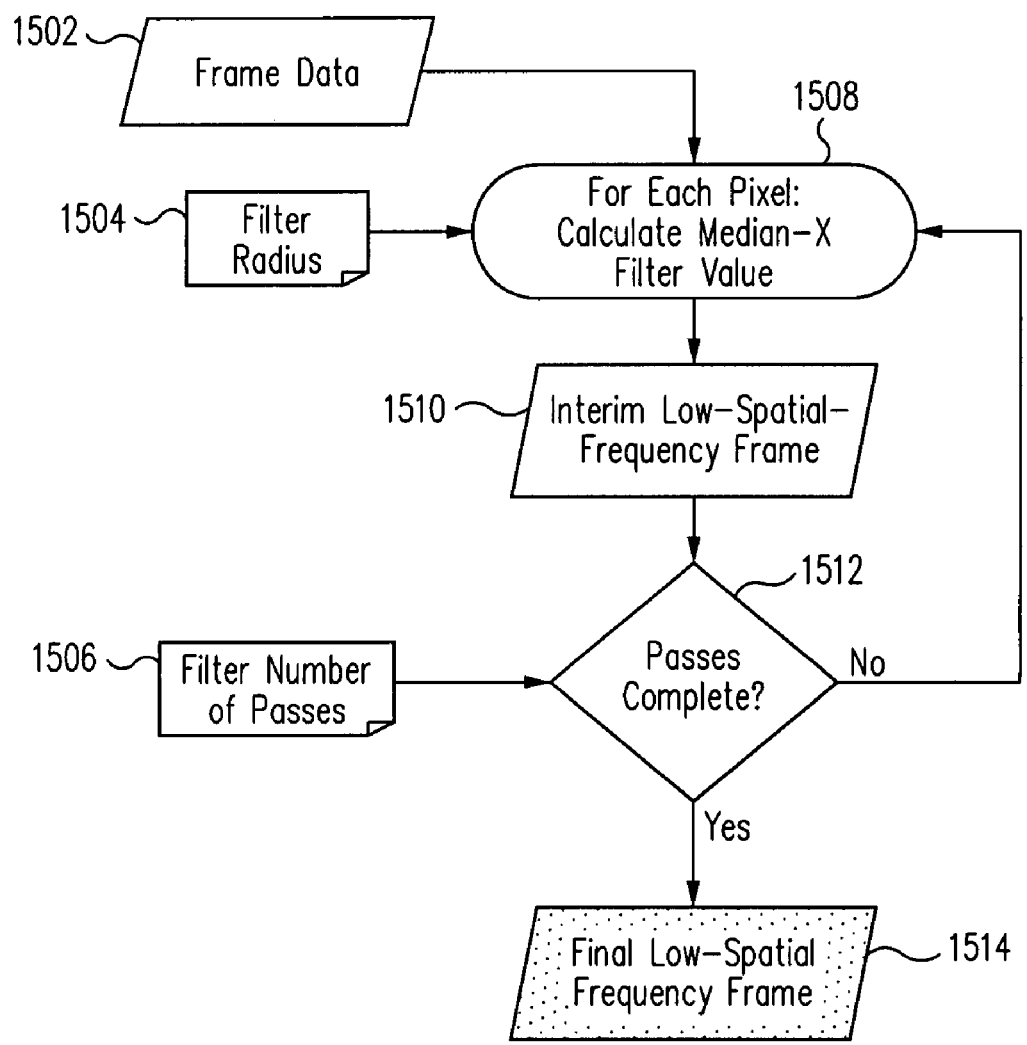
FIG. 15 shows an example of a Median-X filtering process in accordance with one or more embodiments of the present invention.

For example, FIG. 15 shows an example of a Median-X filtering process for the two-dimensional case in accordance with one or more embodiments of the present invention. Specifically, raw frame data (block 1502) is provided to the Median-X filter and the kernel radius is also provided as an input parameter (block 1504). The Median-X filter algorithm calculates the median value of an X-shaped kernel surrounding each pixel (block 1508) to produce a low-spatial-frequency frame (block 1510). If the parameter for the number of passes (blocks 1506 and 1512) is greater than one, the output of the current filter pass is used as input for the next filter pass (e.g., starting with block 1508). Once the number of filter passes has been reached, the final low-frequency frame is provided (block 1514), which represents the output of the Median-X filter algorithm. As a specific example for FIG. 15, the filter (kernel) radius may be set to a value of six (block 1504), the number of passes may be set to a value of two (block 1506), which may provide a balance between image filter characteristics and speed of calculations with respect to infrared camera images (e.g., for particular infrared camera data).

The filtering process of FIG. 15 (e.g., all or a portion of the process) may be implemented, in accordance with one or more embodiments of the present invention, within a computer or computer system (e.g., a processor-based system or other type of logic device having associated memory) executing image processing software algorithms (or other type of instructions), with the computer also optionally storing image frames and resulting frames of data from the image processing (e.g., as discussed similarly for image processing 204 of FIG. 2). Thus for example in some embodiments, this filtering process and other processes discussed herein (e.g., such as discussed in reference to FIGS. 16a and 16b) may be implemented within an infrared camera system or within infrared camera test equipment.

Figure 16A:
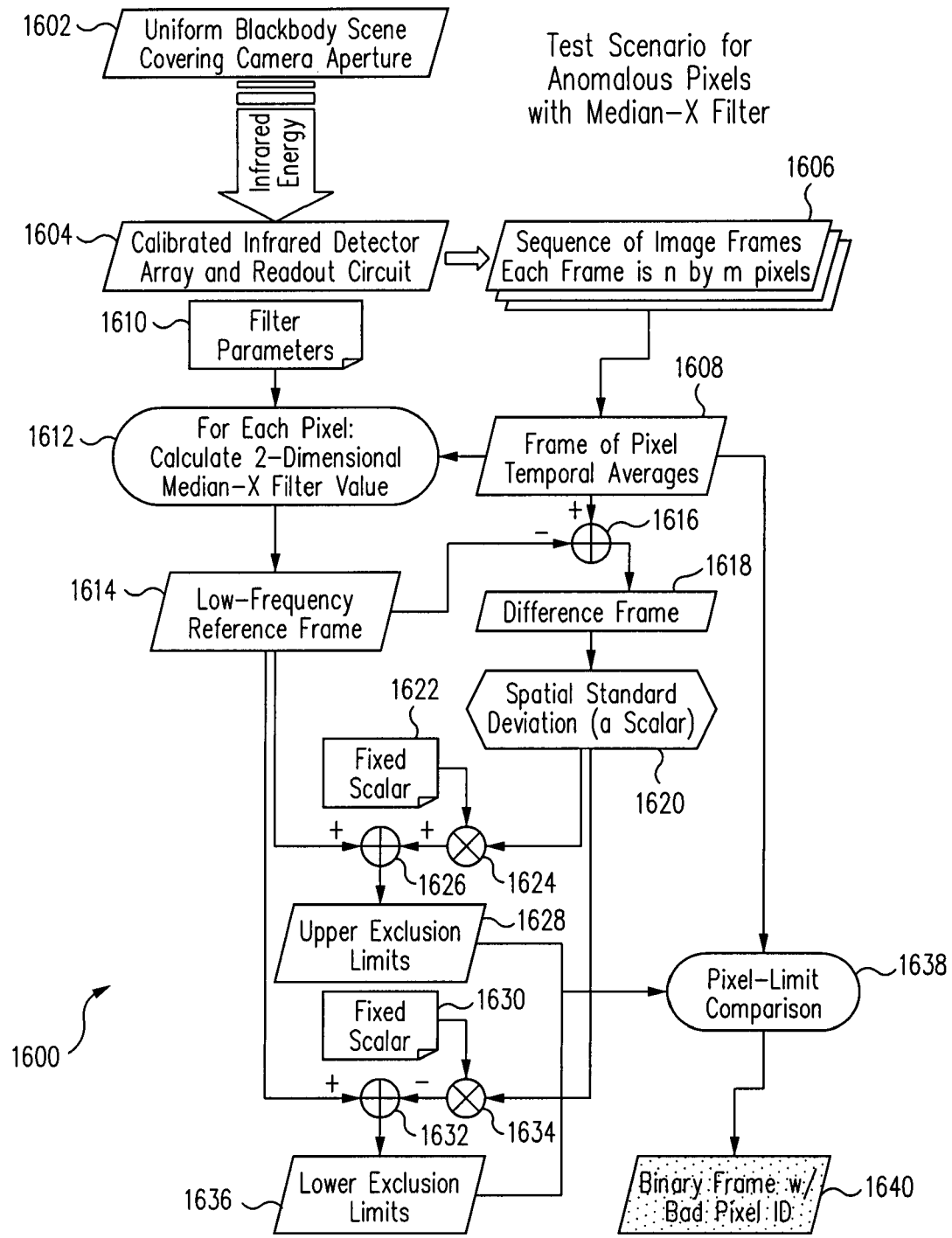
FIGS. 16a-16b show test scenario examples using a Median-X filtering process and a Median-Star kernel filtering process, respectively, in accordance with one or more embodiments of the present invention.
Figure 16B:
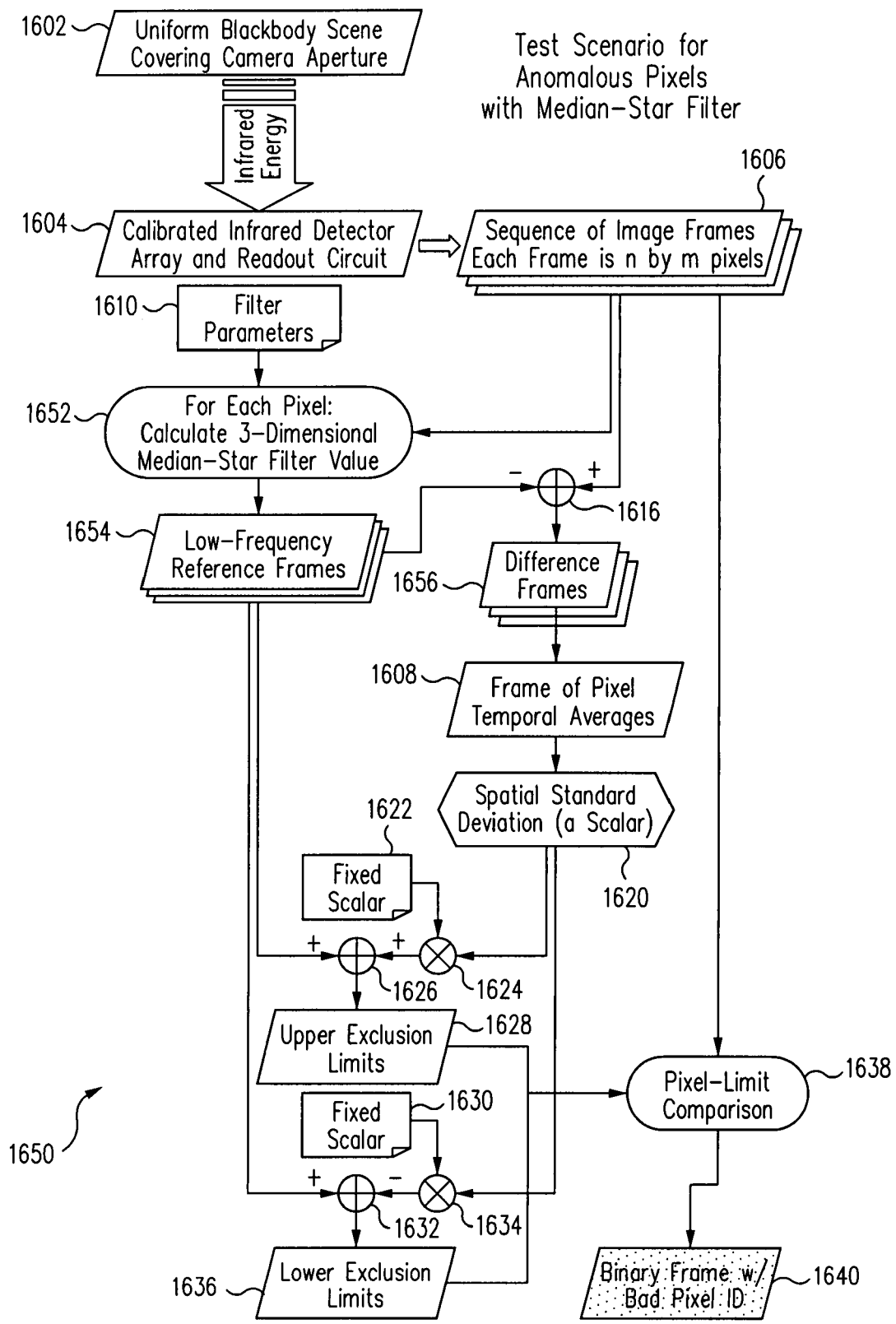

The Median-X filter algorithm may be employed in a variety of infrared image processing applications in accordance with one or more embodiments of the present invention. For example, FIGS. 16a-16b show test scenario examples using a Median-X filtering process (flowchart 1600) and a Median-Star kernel filtering process (flowchart 1650), respectively, in accordance with one or more embodiments of the present invention. Specifically, these test scenario examples illustrated in flowcharts 1600 and 1650 provide an implementation example of the Median-X filtering process in the context of bad-pixel identification (e.g., detecting anomalous pixels using the Median-X filtering process, such as for specific X and Star filter implementations).

As shown in flowchart 1600, a uniform blackbody scene (1602) provides infrared energy for an infrared detector (block 1604), which provides a number of image frames of data (block 1606) from which pixel temporal averages are determined (block 1608). The Median-X filter is applied (block 1612) based on desired filter parameters (block 1610) and the frame of pixel temporal averages to generate a low frequency reference frame (block 1614), which is subtracted from the frame of pixel temporal averages (block 1616) to provide a difference frame (block 1618). A spatial standard deviation may be determined (block 1620), which may be multiplied with desired scalars (blocks 1622, 1624, 1630, and 1634) for setting upper and lower exclusion limits (blocks 1626, 1628, 1632, and 1636) to perform a pixel-limit comparison (block 1638) against the difference frame (block 1618) to identify bad pixels (block 1640).

The process shown in flowchart 1650 is similar to that described for flowchart 1600 and therefore the discussion for similar process blocks will not be repeated. However, flowchart 1650 illustrates the use of the Median-Star filter (block 1652) to generate the low frequency reference frames (block 1654), which are used to generate difference frames (block 1656), the frame of pixel temporal averages (block 1608), and the spatial standard deviation used for the upper and lower exclusion limits as discussed previously. The pixel limit comparison (block 1638) uses the upper and lower exclusion limits to compare against the image frames of data (block 1606) to identify bad pixels (block 1640), as shown in FIG. 16*b*.

In general, these test scenarios provide for identifying bad pixels by utilizing the two-dimensional Median-X filter to provide a robust low-spatial-frequency reference frame or the three-dimensional Median-Star filter to provide a robust sequence of low-spatial-frequency reference frames. The reference frame provides a baseline landscape to which each pixel is compared (e.g., in a corresponding frame). Pixels that are very distant from the reference frame are declared bad (e.g., a pixel that is bad in any frame is considered bad in the final binary frame). The distance threshold for bad pixels may be determined from fixed inputs to the algorithm (denoted "fixed scalars" in the flowcharts). For example, these scalars (numbers) may be large for a loose threshold, and may be small for a tight threshold. Furthermore, to accommodate many different image types, the scalars may be multiplied by the average spatial standard deviation within the image to determine the bad-pixel threshold. As a specific example, if the image is to be trimmed very close to the reference, then a small (e.g., approximately 1.0) scalar may be used, while if the image is to be trimmed further from the reference, then a larger scalar (e.g., approximately 3.0-5.0) may be used.

In accordance with an embodiment of the present invention, the image data (e.g., image array) may be stored as one-dimensional vectors. For example for a two-dimensional image frame that is stored in a one-dimensional array, the 'X' pattern must be identified with one-dimensional indices. Thus, the indices in the one-dimensional vector that make up the 'X' pattern in the two-dimensional array may be identified, for example, using an algorithm such as shown in FIG. 17 in accordance with one or more embodiments of the present invention. Specifically as an example, for an image with n rows and m columns (e.g., where n and m represent any values) stored in a one-dimensional array, the indices corresponding to the 'X' pattern for a pixel in the $i^{th}$ row and $j^{th}$ column may be determined as shown in FIG. 17 (e.g., the indices are determined to produce an X-pattern of radius r). In general, the formulas should be checked operationally to ensure that they lie within the image (e.g., an up/down check), and that they are not mirrored from a valid but distant point in the image into a local kernel (e.g., a left/right check).

The Median-X filter algorithm parameters may be adjusted to emphasize particular features in the image in accordance with one or more embodiments of the present invention. For example, more smoothing may be accomplished in general by increasing the number of passes, while higher spatial frequencies may be suppressed by decreasing the kernel radius.

As specific examples, an implementation example of the Median-X filter algorithm has been tested on a variety of images, with typical results shown as discussed in reference to FIGS. 18*a*-18*c*, in accordance with one or more embodiments of the present invention. Specifically, FIG. 18*a* illustrates two representations of a raw infrared image that was produced while viewing a flat blackbody scene. The resulting infrared image shows significant frame curvature, anomalous pixels, and other fixed-pattern noise (e.g., noise sources that are common in infrared images of blackbody scenes). As discussed previously, for an anomalous pixel test, if all pixels in the image were compared to a constant value (e.g., the frame average), pixels in the corners of the frame would be incorrectly identified as being significantly different from average, resulting in a False Positive (Type I) test error. Additionally, many of the anomalous pixels would not be identified as bad, resulting in a False Negative (Type II) test error.

FIG. 18*b* illustrates a low-frequency reference frame calculated from the raw image by the Median X filter (kernel) algorithm (e.g., with radius of six and two passes). The Median-X filtering algorithm may be viewed or used as a type of 'low-pass' filter, extracting the low-frequency undulations from the original image, while suppressing high-frequency oscillations (as shown in FIG. 18*b*).

FIG. 18*c* illustrates a 'flattened' image that may represent the comparison of each individual pixel in the raw image to its corresponding pixel in the curved reference frame. Because the 'low-frequency' components of the image have been removed in the final image, the end result of the two operations may be viewed as a type of 'high-pass' filter. For an anomalous pixel test, all pixels in the image are compared to a constant value, but because the frame has been flattened, Type I and Type II test errors may be eliminated. Furthermore, anomalous pixels may not be obscured by frame curvature, and the image corners may not become clipped by flat limits as with conventional approaches.

In accordance with an embodiment of the present invention, an implementation example of the Median-X filter algorithm was used on a pixel "kill" station for initial testing and validation for determining bad pixels. A number of test runs have also been made in an infrared detector development calibration chamber. The test results indicate that the Median-X filter algorithm meets test expectations, such as for 'low-pass' filtering in slow-pixel and gain mowing operations for various types of infrared cameras.

Systems and methods are disclosed herein to provide automated testing of infrared sensors to detect image quality defects. For example, in accordance with an embodiment of the present invention, image processing algorithms are disclosed to generate an image quality metric (e.g., a Clark-Evans statistic). The image quality metric may be used, in conjunction with pre-determined thresholds, to detect the presence of image quality defects (or lack thereof).

As an example in accordance with an embodiment of the present invention, the thresholds for the image quality metric may be established from production data to minimize type I (False Positive) and type II (False Negative) errors. The production data may be coupled with subjective feedback regarding image quality to establish or adjust the thresholds (e.g., production threshold determination with iterative improvement scheme based on production statistics and subjective image quality feedback).

For example in accordance with an embodiment of the present invention, dual thresholds may be employed to clearly indicate based on the image quality metric whether the infrared sensor for the corresponding image is either clearly defective or clearly defect free. If clearly defect free, the infrared camera can be shipped without manual inspection. If clearly defective, the infrared camera can be prevented from being shipped (e.g., sold) and no manual inspection is required.

As some overlap of the image quality metric between good and bad images is expected, the image processing algorithms may be used to reduce the number of infrared cameras that are subject to manual inspection. If the image quality metric value falls between the thresholds, then the infrared camera may be manually inspected.

Furthermore, systems and methods are disclosed herein to provide filtering techniques for infrared image processing. For example, in accordance with an embodiment of the present invention, a Median-X filter is disclosed to provide a low-frequency reference frame for infrared image processing, which may be used for various applications to test infrared cameras and to image quality improvement.

In general in accordance with one or more embodiments, a multi-dimensional filter is disclosed that provides a useful reference frame for infrared image processing. For example, the Median-X filter may use the median value of a pixel group that forms an 'X' pattern around a central pixel, in contrast to some conventional approaches that use area kernels. The 'X' pattern may mitigate the skewing effects of row and column noise that plague infrared images and may also reduce calculation time of the kernel median, as compared to area kernels. The filter may be applied to two-dimensional infrared images, resulting in a reference frame that robustly captures low-spatial-frequency undulations in the image. The filter may also be applied to a sequence of infrared image frames, producing a spatio-temporal filtering. In both examples, the resulting reference frames are useful for a wide range of infrared image processing tasks, such as low-pass and high-pass filtering, noise suppression, outlier identification, and/or quality analysis.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of performing infrared image processing on infrared image data, the method comprising:
    receiving one or more infrared image frames of the infrared image data;
    calculating a median value of an X-shaped kernel surrounding each pixel of the infrared image frame; and
    providing a low-frequency reference frame based on the calculating.

2. The method of claim 1, wherein the infrared image frames for the receiving are provided by an infrared sensor.

3. The method of claim 1, wherein the X-shaped kernel comprises a Median-Star kernel.

4. The method of claim 1, further comprising:
    receiving a filter radius parameter for the X-shaped kernel;
    receiving a number of passes parameter; and
    repeating the calculating based on the number of passes parameter, with the low-frequency reference frame from the prior calculating used for the subsequent calculating.

5. The method of claim 4, wherein the method is performed within an infrared camera and the infrared image frames are stored as one-dimensional arrays, and wherein the method further comprises determining indices corresponding to the X-shaped kernel for the calculating.

6. The method of claim 1, further comprising:
    determining a frame of pixel temporal averages based on the infrared image frames, wherein the calculating is performed on the pixel temporal averages;
    subtracting the low-frequency reference frame from the frame of pixel temporal averages to provide a difference frame;
    applying scalar values to the low-frequency reference frame to set upper and lower limits;
    performing a pixel limit comparison based on the upper and lower limits and the frame of pixel temporal averages; and
    identifying bad pixels in the infrared image frame based on the performing of the pixel limit comparison.

7. The method of claim 6, further comprising determining a standard deviation based on the difference frame, wherein the scalar values are multiplied by the standard deviation, with the result used by the applying to set the upper and lower limits.

8. The method of claim 1, wherein the X-shaped kernel comprises a Median-Star kernel and wherein the method further comprises:
    subtracting the low-frequency reference frames from the infrared image frames to provide difference frames;
    determining a frame of pixel temporal averages based on the difference frames;
    applying scalar values to the low-frequency reference frames to set upper and lower limits;
    performing a pixel limit comparison based on the upper and lower limits and the infrared image frames; and
    identifying bad pixels in the infrared image frames based on the performing of the pixel limit comparison.

9. The method of claim 8, further comprising determining a standard deviation based on the frame of pixel temporal averages, wherein the scalar values are multiplied by the standard deviation, with the result used by the applying to set the upper and lower limits.

10. An infrared camera system comprising:
    a processor;
    a memory storing instructions for the processor to perform infrared image processing comprising:
        performing a Median-X filtering algorithm on one or more infrared image frames; and
        providing one or more low-frequency reference frames based on the performing of the Median-X filtering algorithm.

11. The infrared camera system of claim 10, further comprising an infrared sensor adapted to provide the infrared image frames, wherein the infrared camera system comprises an infrared camera or automated infrared camera test equipment and the infrared image frames are stored as one-dimensional arrays, and wherein the method further comprises determining indices for the Median-X filtering algorithm for the performing.

12. The infrared camera system of claim 10, wherein the median-X filtering algorithm uses a two-dimensional X-shaped kernel or a three-dimensional Median-Star kernel.

13. The infrared camera system of claim 10, wherein the infrared image processing comprises at least one of detail enhancement, flat-field correction, bad pixel detection, low pass filtering, or high pass filtering.

14. The infrared camera system of claim 10, wherein the instructions for the processor to perform infrared image processing further comprises:
    determining a frame of pixel temporal averages based on the infrared image frames, wherein the performing is performed on the pixel temporal averages;
    subtracting the low-frequency reference frame from the frame of pixel temporal averages to provide a difference frame;
    applying scalar values to the low-frequency reference frame to set upper and lower limits;
    performing a pixel limit comparison based on the upper and lower limits and the frame of pixel temporal averages; and
    identifying bad pixels in the infrared image frame based on the performing of the pixel limit comparison.

15. The infrared camera system of claim 10, wherein the Median-X filtering algorithm uses a Median-Star kernel and wherein the instructions for the processor to perform infrared image processing further comprises:
    subtracting the low-frequency reference frames from the infrared image frames to provide difference frames;
    determining a frame of pixel temporal averages based on the difference frames;

applying scalar values to the low-frequency reference frames to set upper and lower limits;

performing a pixel limit comparison based on the upper and lower limits and the infrared image frames; and identifying bad pixels in the infrared image frames based on the performing of the pixel limit comparison.

16. A non-transitory machine-readable storage medium containing information to provide a processor-based device with the capability to perform a method of infrared image processing, the method comprising:

performing a Median-X filtering algorithm on one or more infrared image frames; and providing one or more low-frequency reference frames based on the performing of the Median-X filtering algorithm.

17. The method of claim 16, wherein the median-X filtering algorithm uses a two-dimensional X-shaped kernel or a three-dimensional Median-Star kernel.

18. The method of claim 16, wherein the infrared image processing comprises at least one of detail enhancement, flat-field correction, bad pixel detection, low pass filtering, or high pass filtering.

19. The method of claim 16, wherein the method further comprises:

determining a frame of pixel temporal averages based on the infrared image frames, wherein the performing is performed on the pixel temporal averages;

subtracting the low-frequency reference frame from the frame of pixel temporal averages to provide a difference frame;

applying scalar values to the low-frequency reference frame to set upper and lower limits;

performing a pixel limit comparison based on the upper and lower limits and the frame of pixel temporal averages; and identifying bad pixels in the infrared image frame based on the performing of the pixel limit comparison.

20. The method of claim 19, wherein the method further comprises determining a standard deviation based on the difference frame, wherein the scalar values are multiplied by the standard deviation, with the result used by the applying to set the upper and lower limits.

21. The method of claim 16, wherein the Median-X filtering algorithm uses a Median-Star kernel and wherein the method further comprises:

subtracting the low-frequency reference frames from the infrared image frames to provide difference frames;

determining a frame of pixel temporal averages based on the difference frames;

applying scalar values to the low-frequency reference frames to set upper and lower limits;

performing a pixel limit comparison based on the upper and lower limits and the infrared image frames; and identifying bad pixels in the infrared image frames based on the performing of the pixel limit comparison.

22. The method of claim 21, wherein the method further comprises determining a standard deviation based on the frame of pixel temporal averages, wherein the scalar values are multiplied by the standard deviation, with the result used by the applying to set the upper and lower limits.

23. The method of claim 16, wherein the infrared image frames are stored as one-dimensional arrays, and wherein the method further comprises determining indices for the Median-X filtering algorithm for the performing.

* * * * *